(12) United States Patent
Curry et al.

(10) Patent No.: US 9,694,635 B2
(45) Date of Patent: Jul. 4, 2017

(54) APPARATUS AND METHOD FOR INCREASING THE TRACTION OF VEHICLE WHEELS

(71) Applicant: Michael D. Curry, Harrisonburg, VA (US)

(72) Inventors: Michael D. Curry, Harrisonburg, VA (US); Kevin Moore, Nokesville, VA (US)

(73) Assignee: EZAS, LLC, Harrisonburg, VA (US)

( * ) Notice: Subject to any disclaimer, the term of this patent is extended or adjusted under 35 U.S.C. 154(b) by 0 days.

(21) Appl. No.: 14/465,180

(22) Filed: Aug. 21, 2014

(65) Prior Publication Data
US 2015/0053322 A1    Feb. 26, 2015

Related U.S. Application Data

(60) Provisional application No. 61/868,642, filed on Aug. 22, 2013.

(51) Int. Cl.
*B60C 27/20*  (2006.01)
*B60C 27/02*  (2006.01)

(52) U.S. Cl.
CPC ...... *B60C 27/0223* (2013.01); *B60C 27/0276* (2013.04); *B60C 27/20* (2013.01); *Y10T 29/49538* (2015.01)

(58) Field of Classification Search
CPC .......... B60B 15/00; B60B 15/02; B60B 15/04
See application file for complete search history.

(56) References Cited

U.S. PATENT DOCUMENTS

| 1,406,403 A | 2/1922 | McCook |
| 1,578,071 A | 3/1926 | Cadieux |
| 1,682,618 A | 8/1928 | Kline |
| 1,695,450 A | 12/1928 | Bryant |
| 1,719,746 A | 7/1929 | Baker |

(Continued)

FOREIGN PATENT DOCUMENTS

| DE | 32 27 872 A1 | 1/1984 |
| GB | 2 135 252 A | 8/1984 |

(Continued)

OTHER PUBLICATIONS

International Search Report issued Dec. 18, 2014 in International Patent Application No. PCT/US2014/052307.

(Continued)

*Primary Examiner* — John Walters
*Assistant Examiner* — James Triggs
(74) *Attorney, Agent, or Firm* — Venable LLP; Steven J. Schwarz; Trent B. Ostler

(57) ABSTRACT

A tire traction device can include a primary strap configured to extend around at least a portion of a vehicle tire; a traction plate having a channel configured to receive the primary strap, and one or more traction-enhancing surfaces extending from the channel; and a base member having a first surface adapted to sit on a circumferential portion of the vehicle tire, and a second surface opposite to the first surface, wherein the second surface defines a recess adapted to receive the channel of the traction plate. Other features and embodiments, and a method of attaching a tire traction device to a vehicle tire, are also described.

22 Claims, 23 Drawing Sheets

(56) References Cited

U.S. PATENT DOCUMENTS

| | | | |
|---|---|---|---|
| 2,058,799 A | 10/1936 | Jacks | |
| 2,679,882 A | 6/1954 | Rich | |
| 2,808,868 A | 10/1957 | Bryan | |
| 2,909,207 A | 10/1959 | Smith | |
| 2,946,366 A | 7/1960 | Saperstein | |
| 3,053,302 A | 9/1962 | Bopst | |
| 3,073,370 A | 1/1963 | Frank | |
| 3,323,572 A | 6/1967 | Farah | |
| 4,036,272 A | 7/1977 | Lee | |
| 4,836,258 A | 6/1989 | Ellis | |
| 5,569,340 A | 10/1996 | Ulrich | |
| 6,016,856 A | 1/2000 | Hynes | |
| 6,581,661 B1 | 6/2003 | Morrison et al. | |
| 6,708,746 B2 | 3/2004 | Wilkinson | |
| 6,860,304 B1 | 3/2005 | Dalrymple | |
| 6,918,544 B2 | 7/2005 | Ferguson | |
| 7,055,567 B1 | 6/2006 | Della Camera | |
| 7,188,638 B1 | 3/2007 | Peach | |
| 7,198,084 B2 * | 4/2007 | Riemer | B60C 27/16 152/187 |
| 7,543,618 B2 | 6/2009 | Stewart | |
| 8,047,245 B2 | 11/2011 | Maritano | |
| 8,113,252 B2 | 2/2012 | Reil | |
| 8,397,772 B1 | 3/2013 | Faridoon | |
| 8,651,154 B1 * | 2/2014 | Chira | B60C 27/16 152/221 |
| 2009/0025845 A1 | 1/2009 | Uemura et al. | |
| 2009/0145530 A1 | 6/2009 | Lammon | |
| 2010/0252160 A1 | 10/2010 | Gelowicz et al. | |
| 2012/0119564 A1 * | 5/2012 | Perry | B60B 15/00 301/44.2 |
| 2012/0153707 A1 | 6/2012 | Dondurur et al. | |
| 2015/0053322 A1 | 2/2015 | Curry et al. | |

FOREIGN PATENT DOCUMENTS

| | | |
|---|---|---|
| GB | 2 433 478 A | 6/2007 |
| JP | 6-171328 A | 6/1994 |
| JP | 6-199121 A | 7/1994 |
| JP | 11-048727 A | 2/1999 |
| JP | 11-348519 A | 12/1999 |
| WO | WO-2012/095248 A1 | 7/2012 |

OTHER PUBLICATIONS

Written Opinion issued Dec. 18, 2014 in International Patent Application No. PCT/US2014/052307.

Bottari, Bottari GripSock Evolution Anti-Skid Traction Device, obtained from: http://www.micksgarage.com/proddetails.aspx?pid=1114057, Dec. 10, 2013.

International Search Report issued Dec. 9, 2016 in International Patent Application No. PCT/US2016/054433.

Written Opinion issued Dec. 9, 2016 in International Patent Application No. PCT/US2016/054433.

* cited by examiner

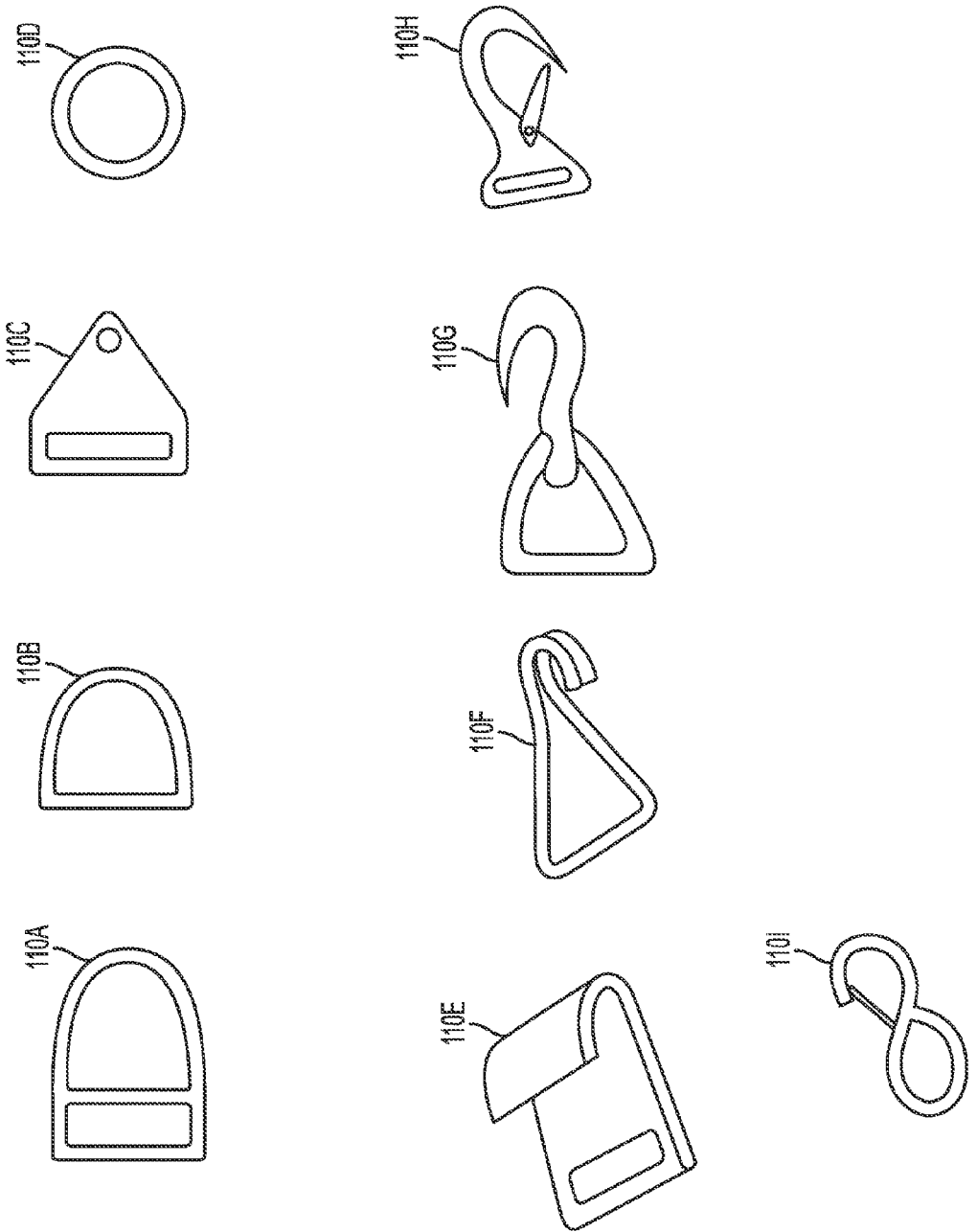

APPARATUS AND METHOD FOR INCREASING THE TRACTION OF VEHICLE WHEELS

CROSS-REFERENCE TO RELATED APPLICATIONS

This patent application claims priority under 35 U.S.C. Section 119 to U.S. Provisional Application No. 61/868,642, filed on Aug. 22, 2013, the entire content of which is incorporated herein by reference in its entirety.

TECHNICAL FIELD

The present application relates generally to apparatuses and methods usable to increase the traction of vehicle wheels. More specifically, the present application relates to apparatuses that can be attached to vehicle wheels, such as around the tires, to improve the traction of the tires, and related methods.

BACKGROUND

Vehicles can occasionally get stuck or go off road, for example, when travelling on muddy, snowy, icy, or sandy road conditions. Often times, it is necessary for a tow truck, hauler, or other rescue vehicle to assist the stuck vehicle. This is especially true in the case of heavy commercial vehicles such as tractor trailers. Tire-mounted devices, such as chains, have been developed to improve tire traction in emergency situations. However, known tire-mounted devices can be difficult to install, and/or provide insufficient traction to assist heavy vehicles in becoming unstuck without outside vehicular assistance.

SUMMARY

According to an embodiment, a tire traction device can comprise: a primary strap configured to extend around at least a portion of a vehicle tire; a traction plate having a channel configured to receive the primary strap, and one or more traction-enhancing surfaces extending from the channel; and a base member having a first surface adapted to sit on a circumferential portion of the vehicle tire, and a second surface opposite to the first surface, wherein the second surface defines a recess adapted to receive the channel of the traction plate.

According to another embodiment, a tire traction device can comprise: a primary strap configured to extend around at least a portion of a vehicle tire; a rubber base member having a first surface adapted to sit on a circumferential portion of the vehicle tire, and a second surface opposite to the first surface, the second surface defining a transverse channel and surface-roughening features on opposite sides of the transverse channel, the rubber base member further including a channel extending through the base member and adapted to receive the primary strap.

According to another aspect, a method of attaching a tire traction device to a vehicle tire can comprise: (a) placing a primary strap through a channel in a traction plate; (b) placing the traction plate on top of a base member; (c) placing the base member on a circumferential portion of the vehicle tire; (d) wrapping the primary strap around a portion of the vehicle tire and through a rim of the vehicle tire; and (e) tightening the primary strap.

According to another embodiment, a tire traction device can comprise: a primary strap configured to extend around at least a portion of a vehicle tire; and a traction plate having a channel configured to receive the primary strap, and one or more traction-enhancing surfaces extending from the channel.

BRIEF DESCRIPTION OF THE DRAWINGS

The foregoing aspects and other features and advantages of the invention will be apparent from the following drawings, wherein like reference numbers generally indicate identical, functionally similar, and/or structurally similar elements.

FIG. 3 depicts various embodiments of connectors that can be used with the tire traction devices of FIGS. 1A to 2C.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

The present invention relates to tire traction devices that can be attached to vehicle wheels to increase grip, for example, in poor road conditions, when travelling through sand, or to escape from emergency situations such as sliding off the road. Embodiments of the tire traction devices disclosed herein can be easily installed and removed from the vehicle tires, for example, making them particularly useful in emergency situations where access to the tires may be limited. For example, embodiments can be applied transversely across the tire, instead of circumferentially around the tire, thereby improving the ease with which the user can apply the devices. Additionally, embodiments may provide sufficient traction to assist even large and heavy vehicles, such as tractor trailers, to become unstuck from emergency situations. While embodiments are described herein with respect to tractor trailer tires, the devices and methods described herein can be used with any number of tire types, including, without limitation, those for passenger vehicles, light trucks, industrial vehicles and equipment, and recreational vehicles such as ATVs and dune buggies.

Figure 1A:
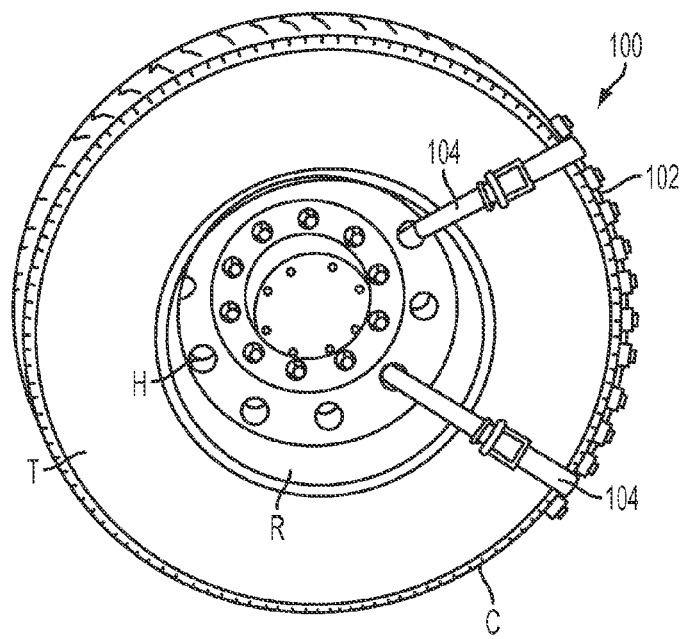
FIG. 1A is a side-perspective view of an embodiment of a tire traction device attached to a tractor trailer tire.
Figure 1B:
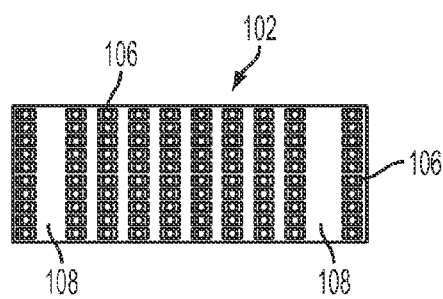
FIG. 1B is a top view of an embodiment of a traction sheet of the tire traction device of FIG. 1A.
Figure 1C:
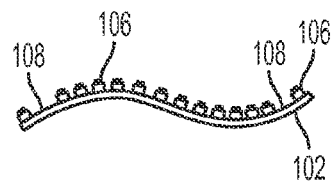
FIG. 1C is a side view of a portion of the traction sheet of FIG. 1B.

Referring to FIGS. 1A to 1C, a first embodiment of a tire traction device 100 according to the present invention is shown. The tire traction device 100 can generally include a traction sheet 102 and one or more straps 104. The traction sheet 102 can include a variety of different traction elements 106, such as, for example, cleats, spoons, spikes, etc., as will be described in more detail below. The traction elements 106 can be formed from metal, such as steel or aluminum, plastic, composite, or other durable materials known in the art. The traction elements 106 can be formed integrally with the traction sheet 102, or can comprise separate components coupled thereto.

The straps 104 can be used to install the traction sheet 102 onto a portion of the circumference C of a vehicle tire T. For example, according to an embodiment, a user can lay the traction sheet 102 on the circumference C of the tire T with the traction elements 106 facing outward. The user can then take one of the straps 104, feed it through the vehicle rim R (e.g., through a hole H), and around the tire T and traction sheet 102. The user can then fully tighten the strap 104 using, e.g., a conventional buckle mechanism to secure the strap 104 into a loop. One or more additional straps 104 can be used to further secure the traction sheet 102 in a similar manner. One or more tractions sheets 102 may be applied to the tire T depending on conditions. After use, the user can loosen the straps 104, remove the straps 104 from the tire T, remove the traction sheet(s) 102, and store them for reuse at a later time. According to embodiments, the straps 104 can be made from leather, plastic, nylon, or other materials known in the art. The buckles can be attached to the straps 104 using, for example, stitching, rivets, bonding, or other known fastening techniques.

One of ordinary skill in the art will appreciate that other fastening mechanism can be used instead of the buckles shown, such as, for example, a ratchet, hook-and-loop fastener, zip ties, or other structures known in the art. Other ways to tighten down the traction sheet 102 can include a hole or channel that would allow a zip tie, wire, or belt with buckle to be fed around the traction sheet 102 and tire and tightened. According to embodiments, the length of the straps 104 can be from about 3 feet to about 4 feet for common vehicles such as cars and light trucks, to longer lengths such as about 5 feet to about 6 feet for large commercial truck tires, tractor tires, and military vehicles. According to embodiments, the straps 104 can have widths ranging from about 1 inch to about 4 inches, however, other configurations are possible.

Referring to FIGS. 1B and 1C, the traction sheet 102 can include slots 108 located between adjacent rows of traction elements 106. Each one of the slots 108 can be dimensioned to receive at least one of the straps 104, for example, to help maintain the strap 104 in place on the traction sheet 102. As an alternative, the straps 104 can feed into sleeves (not shown), such as nylon protecting sleeves, that rest on top of the traction elements 106 and help protect the straps 104 from abrasion caused by the traction elements 106. Alternatively, both the slots 108 and nylon protecting sleeves can be used.

Figure 2A:
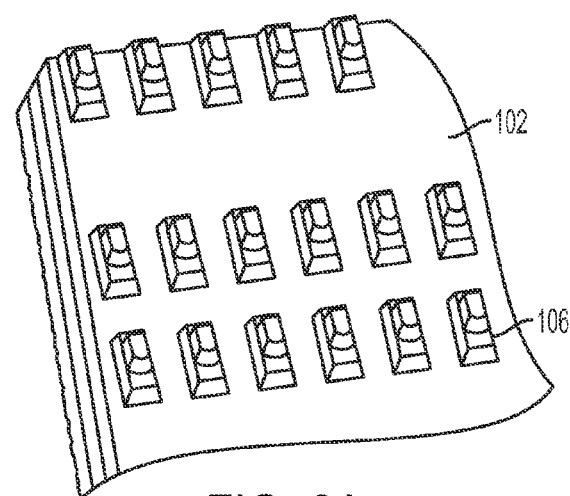
FIG. 2A is a perspective view of a portion of another embodiment of a traction sheet.
Figure 2B:
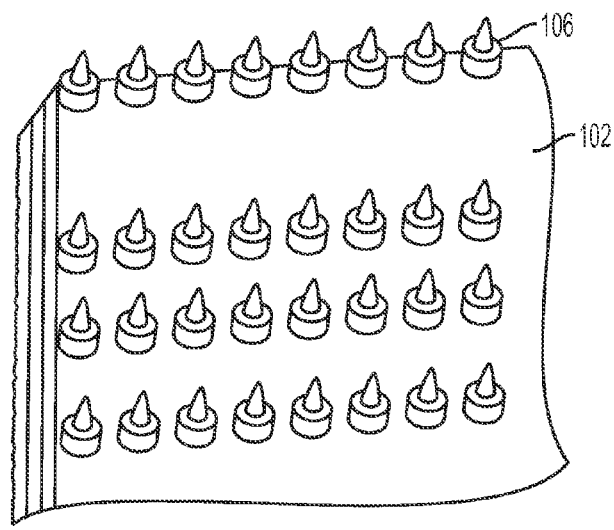
FIG. 2B is a perspective view of a portion of yet another embodiment of a traction sheet.

Referring to FIGS. 2A-2B, the traction sheets 102 can include a variety of different traction elements 106. For example, as shown in FIG. 2A, the traction sheets 102 can be manufactured with built-in cleats as the traction elements 106. Alternatively, as shown in FIG. 2B, the traction elements 106 can comprise metal spikes that are either integral with, or coupled to the, the sheet 102. Other examples of traction elements 106 can include, without limitation, mud spoons, sand paddles, and tread patterns such as those utilized on vehicle tires. Each traction sheet 102 can include a single type of traction element 106 throughout, or alternatively, can include a mixture of different types of traction elements 106.

According to embodiments, the traction sheets 102 can be manufactured from rubber materials such as recycled rubber, butyl rubber, silicone rubber, EPDM rubber, nitrile rubber, Hypalon®, skirtboard, nylon 6-6, plastic materials, and web mesh sheets. According to embodiments, each traction sheet 102 can be approximately one to one and half inches in thickness, or more. According to embodiments, each traction sheet 102 can be between about 4 inches and about 21 inches wide, or more. According to embodiments, each traction sheet 102 can be between about 16 and about 36 inches long, or more.

Figure 2C:
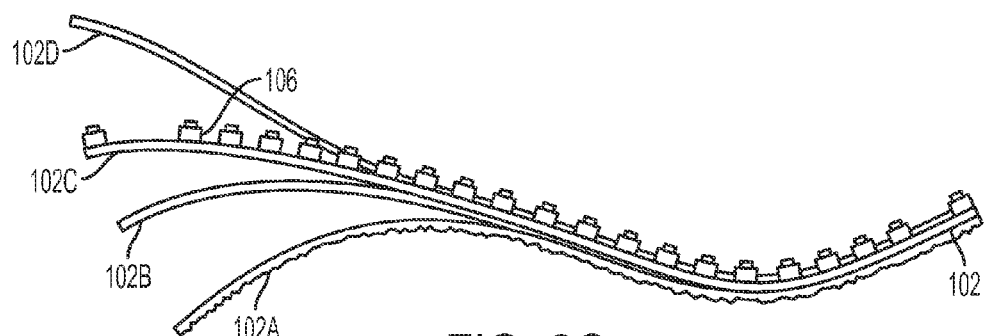
FIG. 2C is a side view of the traction sheet of FIG. 2A, shown with its layers partially separated from one another.

Referring to FIG. 2C, embodiments of the traction sheets 102 can be made from layers 102A to 102D that are secured together. For example, according to embodiments, the bottom layer 102A that abuts the tire can be made from a material having a rough finish to help prevent rubber-to-rubber slippage. Alternatively, the bottom layer 102A can have a friction-enhancing pattern molded into its lower surface, or have a friction-enhancing substance, such as sand, adhered to its lower surface.

The second layer 102B can comprise a thicker base that increases durability, for example, cloth rubber or fiber rubber. The third layer 102C can comprise of the traction elements 106. The top layer 102D can comprise a sealing layer that seals the traction sheet 102 together. One of ordinary skill in the art will appreciate from this disclosure that other types of construction are possible. For example, another embodiment of a traction sheet 102 can comprise a monolithic sheet made from plastic/nylon 6-6 with built-in cleats, ice spikes, or mud spoons. The traction sheets can be made from injection molding, thermoforming, 3-D printing, combinations of these methods, and other manufacturing processes known in the art. Other materials for making the traction sheet 102 can include, for example, Delrin, Acetal, and recycled rubber.

In the embodiment of FIG. 1A, the straps 104 can include a free end that feeds into the buckle to form a loop around the tire T. For example, the strap 104 can extend across the front sidewall of the tire, continue substantially transversely across the tire tread, continue down the rear sidewall, through the rim, with the free end joining the buckle somewhere proximate the front sidewall. According to this configuration, the strap 104 can form a loop around the tire in substantially the "poloidal" direction. Instead of a buckle, other fastening mechanisms, such as a ratchet, can be used to form the strap 104 into a loop.

As an alternative to the buckle-type configuration described above, other embodiments of straps 104 can include connectors on one free end that attach to mating connectors on the other free end in order to form a complete loop. FIG. 3 shows embodiments of connectors 110A-D that can be provided on one end of the strap, such as, for example, a double D-ring 110A, a single D-ring 110B, a receiver 110C and an O-ring 110D. FIG. 3 further shows embodiments of mating connectors 110E-H that can be provided on the other end of the strap, such as flat hook 110E, wire hook 110F, swivel hook 110G, hook with safety latch 110H, and S-hook with safety latch 110I, however, other embodiments are possible. Once looped around the tire T and traction sheet 102 and connected together using the mating connectors 110, the strap 104 can be tightened using a ratchet, buckle, or other structure to remove slack. Alternative attachment techniques can have both ends of the strap 104 connect directly to the rim R or tire T.

Figure 4:
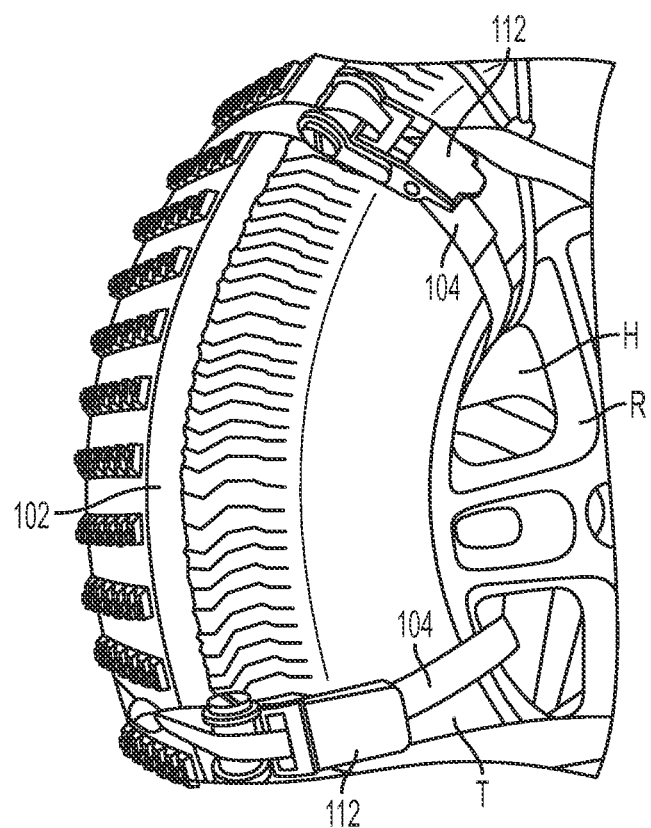
FIG. 4 is a side-perspective view of a second embodiment of a tire traction device attached to a tractor trailer tire.

FIG. 4 depicts an embodiment where the traction sheet 102 is attached to the circumference C of the tire T using straps 104 having spring-loaded ratchets 112 to tighten the straps 104. Examples of these types of straps 104 with a ratchet 112 are commonly referred to as "ratchet straps," as will be explained in more detail below.

Figure 5:
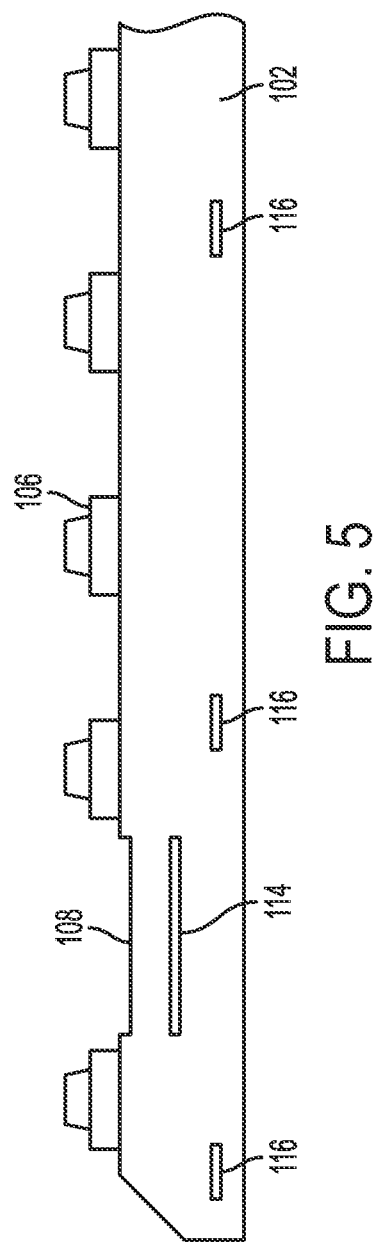
FIG. 5 is a cross-sectional view of a portion of an embodiment of a tire traction sheet.

FIG. 5 depicts a cross-sectional view through a portion of a traction sheet 102 according to an embodiment. According to this embodiment, the traction sheet 102 can include channels 114 and/or 116 that extend cross-wise through the sheet 102. For example, the larger channels 114 can be dimensioned to receive straps 104 of the type discussed above, in order to secure the traction sheet 102 to the tire. The channels 114 can thus be used as an alternative to the slots 108, which can also be provided in the embodiment of FIG. 5. Additionally or alternatively, smaller channels 116 can be dimensioned to receive fasteners such as zip ties or wires, that can be used either as a primary or secondary structure for securing the traction sheet 102 to the tire, e.g., as an alternative to, or in addition to, the straps 104. One of ordinary skill in the art will thus appreciate that various combinations of slots 108, channels 114, and channels 116 can receive cooperating fasteners to secure the traction sheet 102 to a tire. The interior channels 114, 116 can be formed during molding of the sheet 102, e.g., during injection molding, or can be formed while laying up multiple layers of the sheet 102. One of ordinary skill in the art will appreciate from this disclosure that other techniques can be used to form the interior channels 114, 116.

Embodiments of the tire traction device 100 can include a variety of different traction sheets 102 having different types of traction elements 106 suitable for different conditions and environments. Additionally or alternatively, embodiments can include a variety of different traction sheets 102 having different sizes, e.g., to accommodate different wheel types or sizes. According to these embodiments, the user can select the traction sheet 102 most appropriate for the wheel and situation at hand, and can attach that traction sheet 102 to the vehicle tire T using the straps 104 described above.

Figure 6:
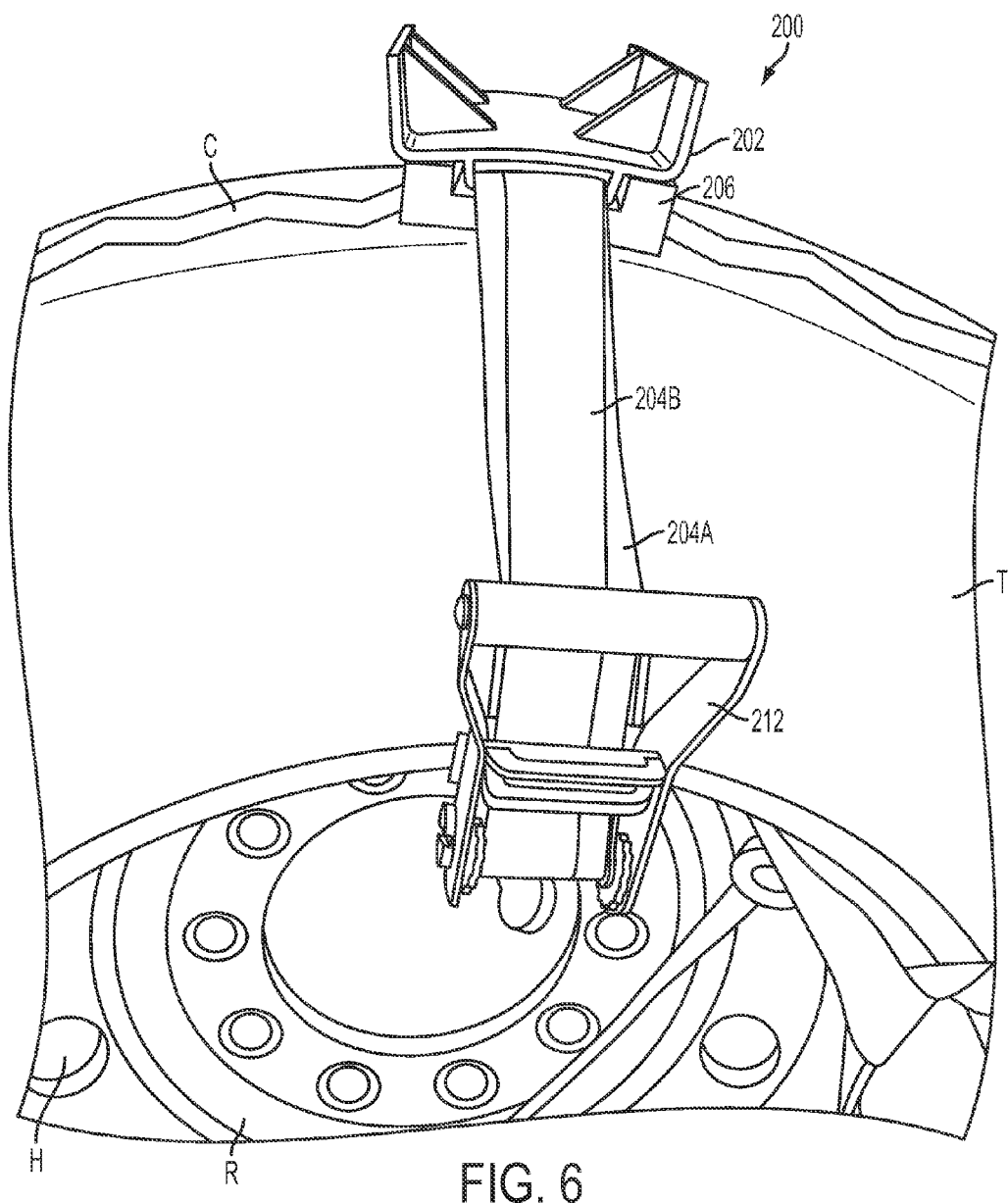
FIG. 6 is a side-perspective view of a third embodiment of a tire traction device attached to a tractor trailer tire.
Figure 7:
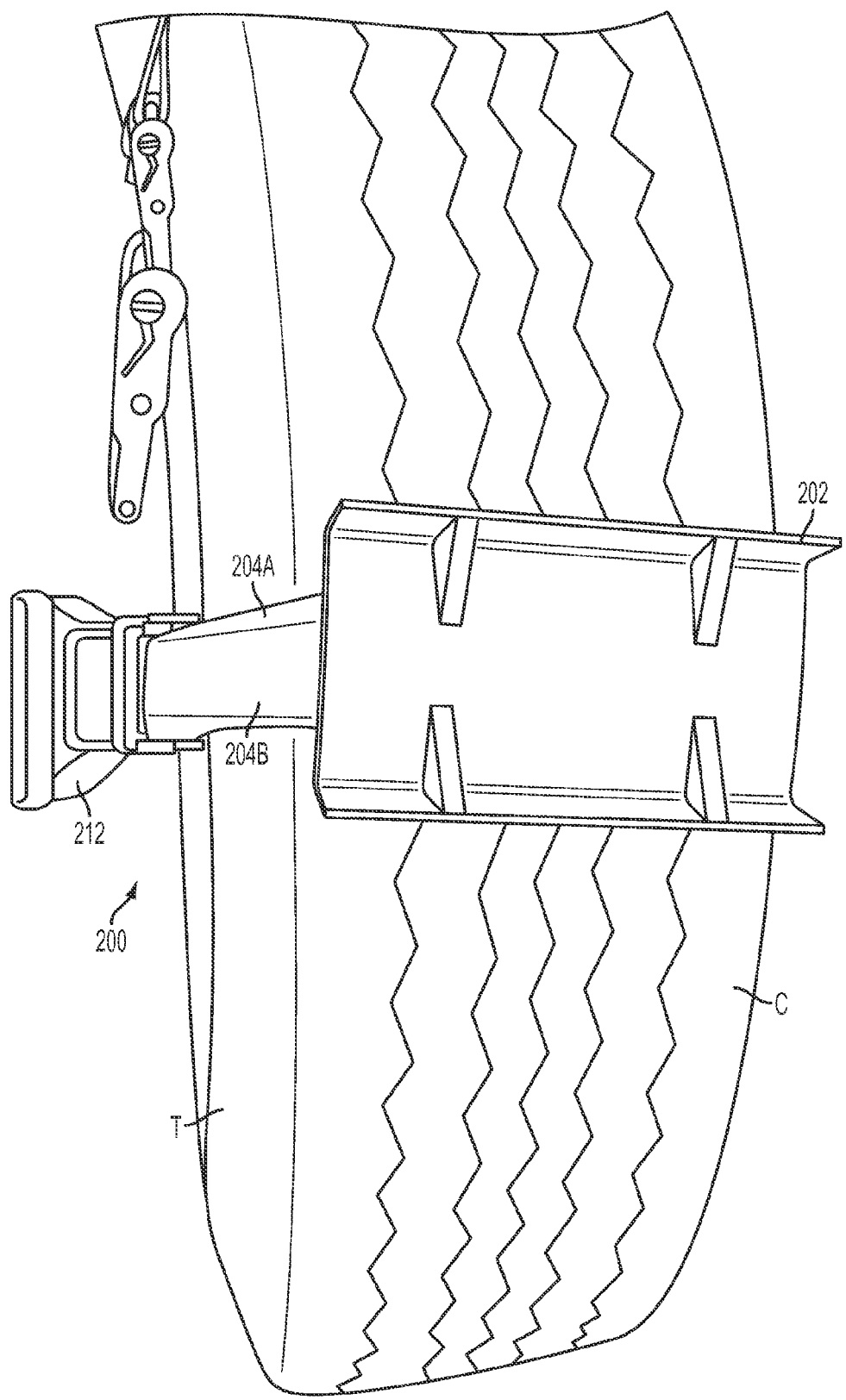
FIG. 7 is a top view of the tire traction device of FIG. 6.

Referring to FIGS. 6 and 7, a second embodiment of a tire traction device 200 is shown. Tire traction device 200 can generally include a traction plate 202, primary strap 204A, optional secondary strap 204B, and a base member 206. The base member 206 can be formed of a rubber or other material described below, and can rest on the circumference C of the tire T. Due to the material properties of the base member 206, it can grip and/or conform to the tire circumference C, contributing to the traction device 200's ability to stay in place on the tire T.

According to embodiments, the traction plate 202 can be formed of metal or other rigid material (described below), and can rest on top of the base member 206. The straps 204A, 204B can extend around the tire T and rim R in a similar manner as described above in connection with previous embodiments, and can attach to the traction plate 202 and thereby secure the tire traction device 200 to the tire T. The straps 204A and optionally 204B can cooperate with ratchet 212 or other fastening device to secure the straps tightly around the tire T, e.g., in the poloidal direction.

Figure 8:
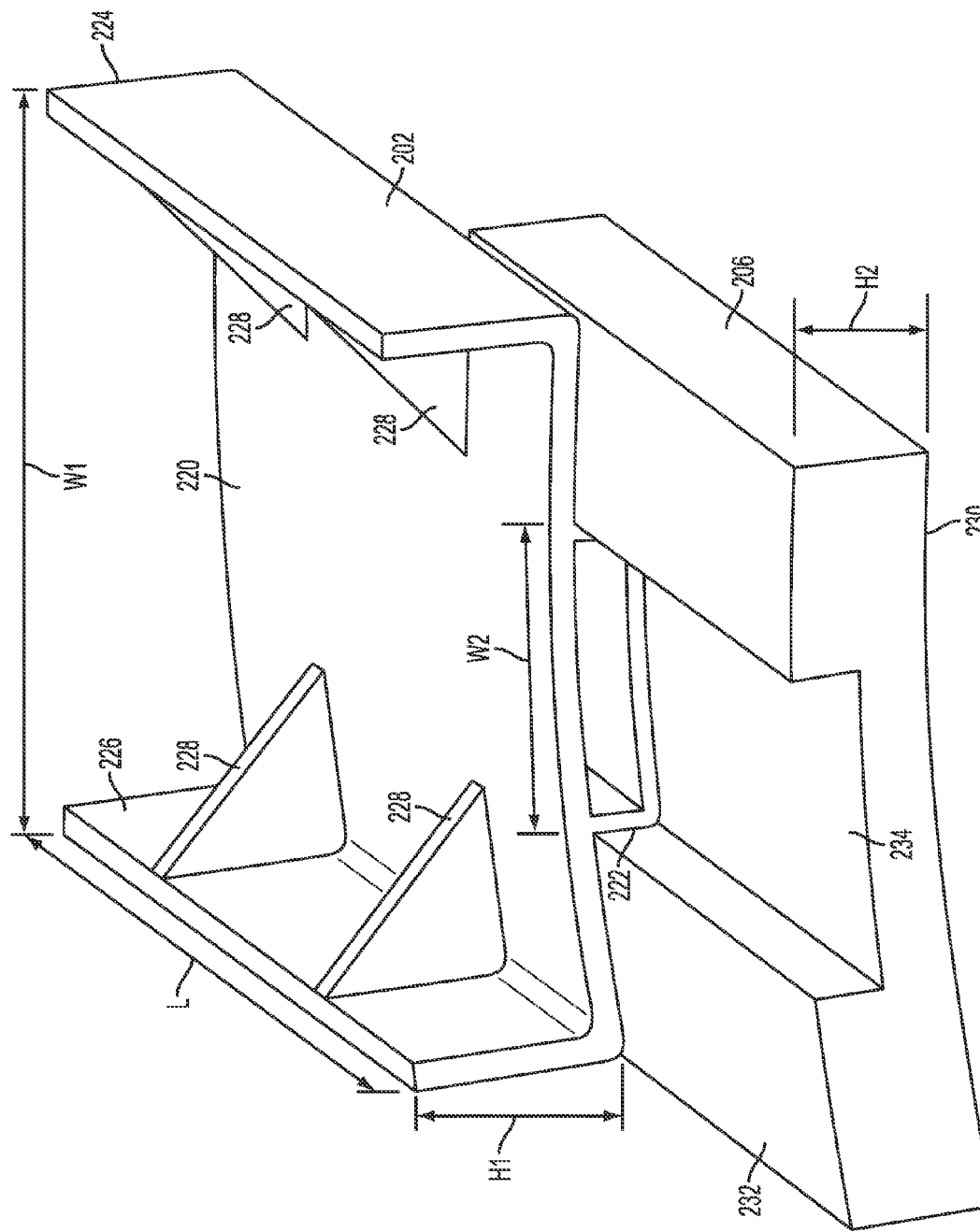
FIG. 8 is a perspective view of a traction plate and base member of the tire traction device of FIG. 6.

Referring to FIG. 8, embodiments of the traction plate 202 and base member 206 are shown in more detail. The traction plate 202 can include a substantially flat plate portion 220 and a channel 222 that extends from the plate portion 220, e.g., below it as shown. According to alternative embodiments, the channel 222 can extend upward from the flat plate portion 220, and the base member 206 can have a corresponding shape to mate with the channel 222, if necessary. The channel 222 can be dimensioned to receive the primary strap 204A and/or secondary strap 204B, in order to secure the traction plate 202 on the tire T. For example, the channel 222 can define a width that is the same as, or slightly larger than, the width of the primary strap 204A and/or secondary strap 204B. According to embodiments, the height of the channel 222 can be significantly larger than the height of the straps 204A, 204B, for ease of inserting the straps 204A, 204B through the channel 222. According to embodiments, the traction plate 202 and base member 206 can be secured together, for example, using bolts extending through the traction plate 202 and base member 206. Alternatively, other types of mechanical fasteners, and fastening techniques known in the art, such as bonding, can be used to join the traction plate 202 and base member 206.

The traction plate 202 can also include one or more traction-enhancing surfaces extending away from the plate portion 220, e.g., upwards. For example, as shown, the traction-enhancing surfaces can include first and second paddles 224, 226 that extend upward from opposed ends of the plate portion 220, e.g., substantially perpendicular thereto. Reinforcement gussets 228 can extend between the plate portion 220 and the paddles 224, 226, for example, to resist the paddles 224, 226 from deflecting with respect to the plate portion 220. The paddles 224, 226 can be formed integrally with the plate portion 220, for example, by bending the plate portion 220 or by extruding the traction plate 202. However, in alternative embodiments, the traction-enhancing surfaces, such as paddles 224, 226 can be separate elements attached to the plate portion 220, for example, through welding, bonding, fasteners, or other techniques known in the art.

One of ordinary skill in the art will appreciate based on this disclosure that the traction-enhancing surfaces are not limited to the paddles 224, 226 shown, and that other structures can be used. For example, lugs, spikes, knobs, spoons, coarse abrasive elements, or other structures can be used to provide traction between the plate 220 and the ground surface.

Still referring to FIG. 8, the base member 206 can generally include a lower surface 230 adapted to rest on the circumference C of a tire T. For example, the lower surface 230 can have a slight curvature that approximates the curvature of a vehicle tire. Additionally or alternatively, the lower surface 230 can have a surface treatment, additive, or other property that increases its grip on tire rubber. The base member 206 can also have an upper surface 232, upon which the plate portion 202 rests. The upper surface 232 can define a recess 234 dimensioned to receive the channel 222 of the plate portion 202, such that the two components nest together. For example, the recess 234 can have internal dimensions that substantially approximate the external dimensions of the channel 222, however, other configurations are possible.

Referring back to FIGS. 6 and 7, the base member 206 can rest on the circumference C of the tire T, with the traction plate 202 resting on top of the base member 206. The primary strap 204A can extend through the channel 222 of the traction plate 202, and around the tire T, e.g., in the poloidal direction. A ratchet 212 or other tightening device can be used to tightly secure the primary strap 204A around the tire T, in order to secure the traction plate and base member 206 on the tire T. According to embodiments, the primary strap 204A can be tightened to the extent that it slightly compresses the tire T and/or the base member 206, increasing the traction device 200's grip on the tire. The secondary strap 204B can also extend through the channel 222 of the traction plate 202, and can engage with the ratchet 212, to further secure the position of the traction plate 202 and base member 206, as will be described in more detail below.

Figure 9:
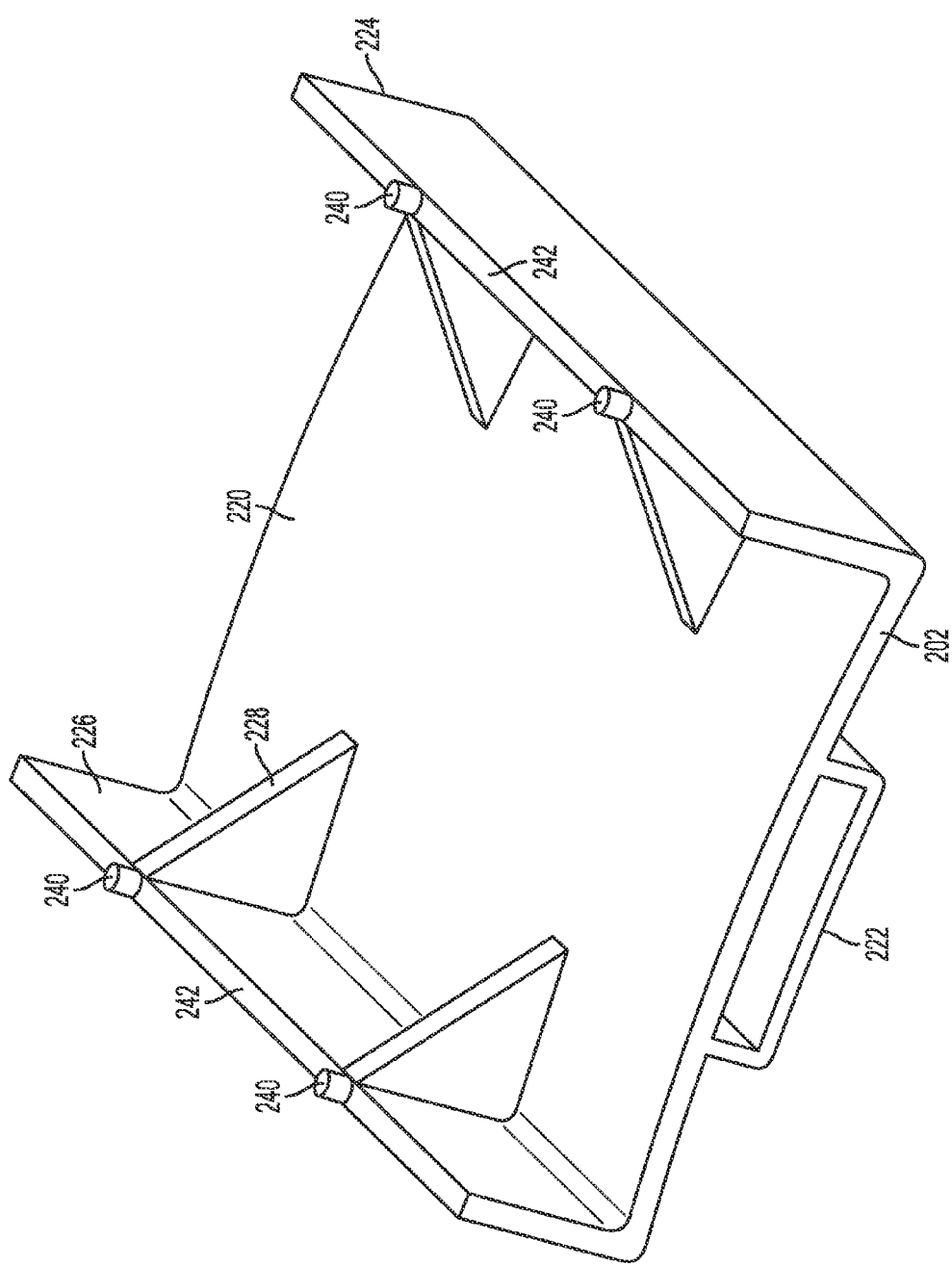
FIG. 9 is a perspective view of an alternative embodiment of a traction plate.

FIG. 9 depicts another embodiment of the traction plate 202. The traction plate 202 of FIG. 9 is substantially similar to that shown and described in connection with FIGS. 6-8, however, the embodiment of FIG. 9 includes studs 240 located on the outer circumferential surfaces 242 of the paddles 224, 226. The studs 240 can increase the grip of paddles 224, 226 on the ground. According to other embodiments, spikes, serrations, knobs, coarse grit, or other traction-enhancing geometries can be applied to the outer circumferential surfaces 242. Embodiments of the invention can work with vehicle tires having widths ranging from, for example, eight inches to 21 inches, or more.

Figure 10:
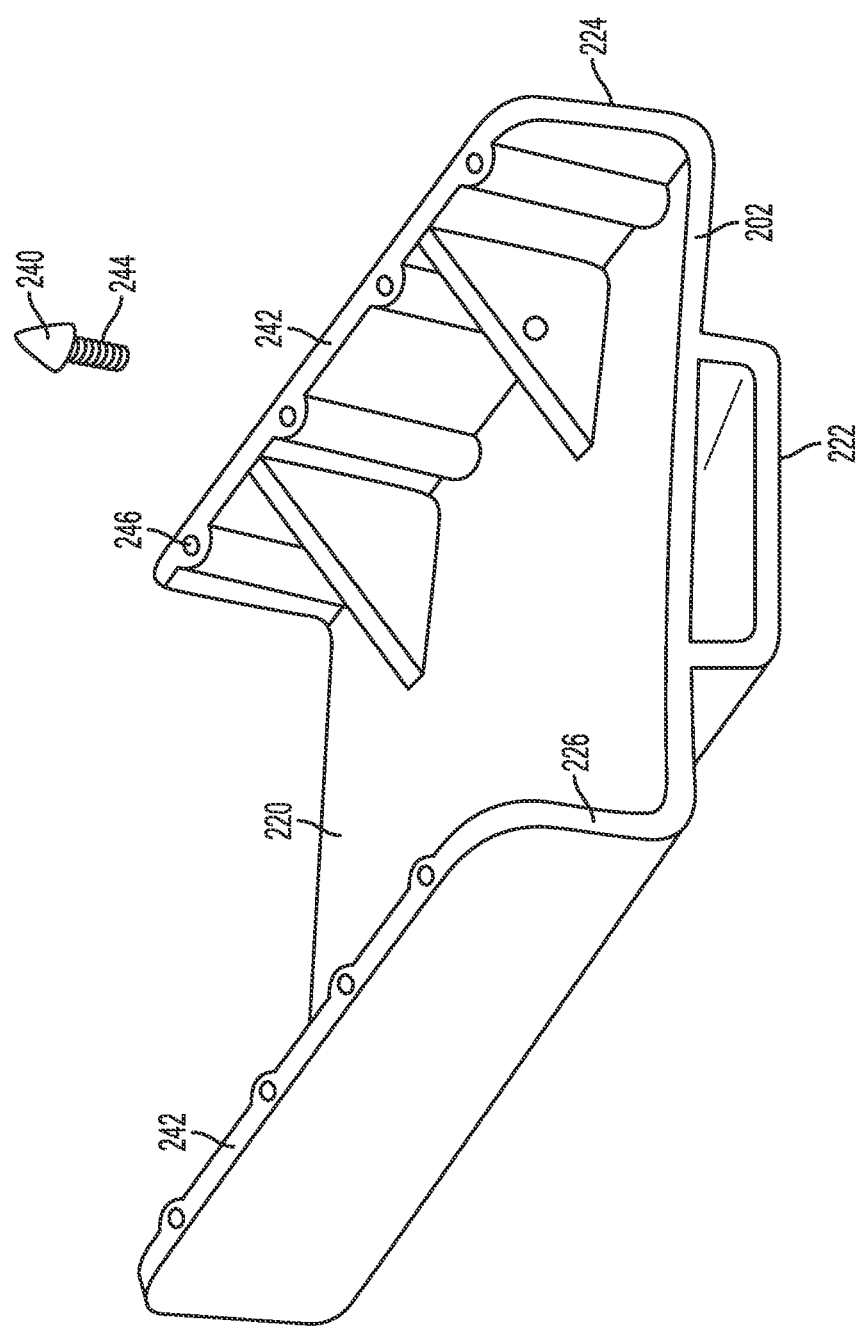
FIG. 10 is a perspective view of yet another embodiment of a traction plate.

FIG. 10 shows a variation of the embodiment of FIG. 9, where the studs 240 are removably and replaceably coupled to the paddles 224, 226, for example, using cooperating threads 244 on the studs 240 and threaded bores 246 in the paddles 224, 226. One of ordinary skill in the art will appreciate from this disclosure, however, that other structures can be used to removably couple the studs 240 to the paddles 224, 226, for example, detents, snap-fit connectors, and the like. One of ordinary skill in the art will also appreciate that other types of traction-enhancing features can be coupled to the paddles 224, 226 in the same manner as studs 240, such as, for example, spikes, lugs, spoons, etc.

Figure 11:
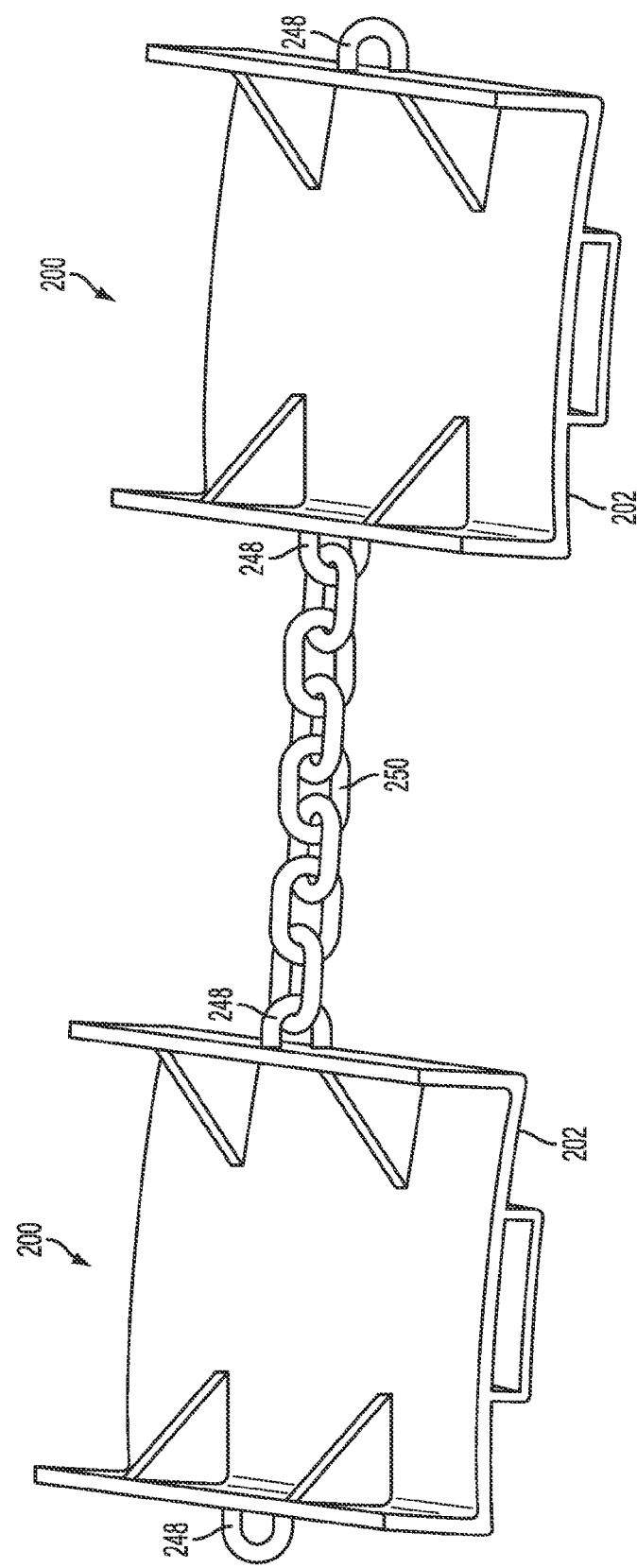
FIG. 11 is a perspective view showing two examples of another embodiment of a traction plate linked together.

FIG. 11 depicts an embodiment of the present invention where two or more tire traction devices 200 can be linked together and distributed around the circumference of the tire. According to the embodiment shown, each traction plate 202 can include one or more connectors 248, such as a ring, that can couple to a linking device 250, such as a chain, to join a pair of traction plates 202 together. According to embodiments, the linking device 250 can be releasably attached to one of the connectors 248 at each end (e.g., using a latch), thus making linking of the traction plates 202 an option. One of ordinary skill in the art will appreciate from this disclosure that other structures besides the rings and chains, shown, can be used to couple traction plates 202 together. For example, nylon webbing, nylon line, steel cable, or other materials can be anchored to adjacent traction plates 202 using, for example, fasteners, bonding, welding, or other techniques. One of ordinary skill in the art will also appreciate from this disclosure that the distance between traction plates 202 can be varied depending on the application, such as, the size of the tire T or the road conditions confronting the vehicle. The base members 206 and straps 204A, 204B are not shown in FIG. 11, but can be the same, or substantially the same, as those described throughout this specification.

Figure 12:
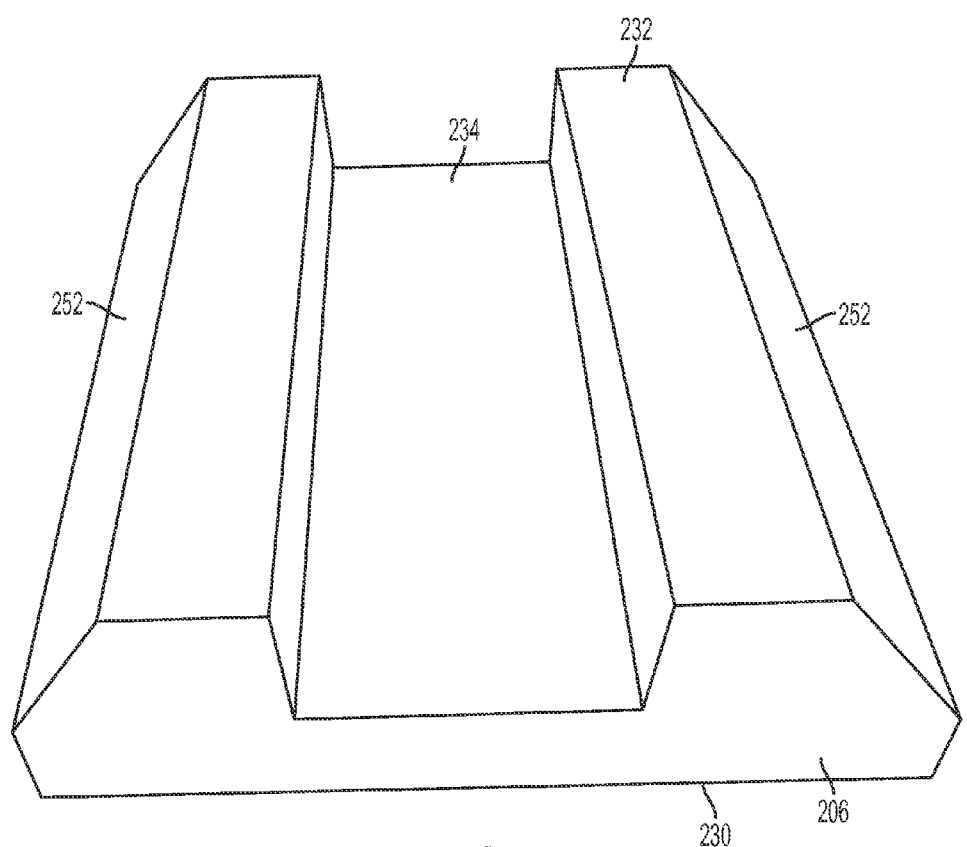
FIG. 12 is a perspective view of an alternative embodiment of a base member.
Figure 13:
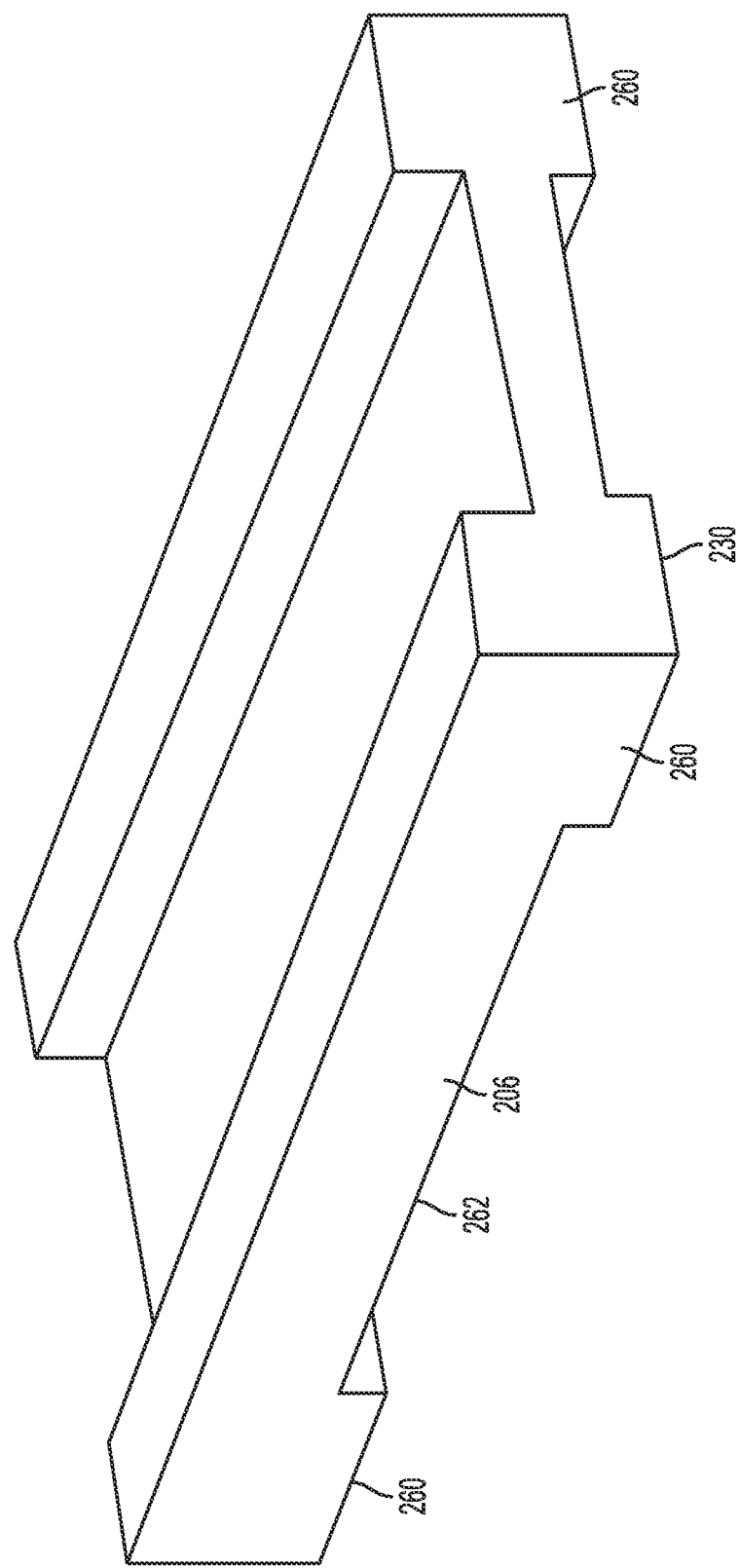
FIG. 13 is a perspective view of another alternative embodiment of a base member.
Figure 14:
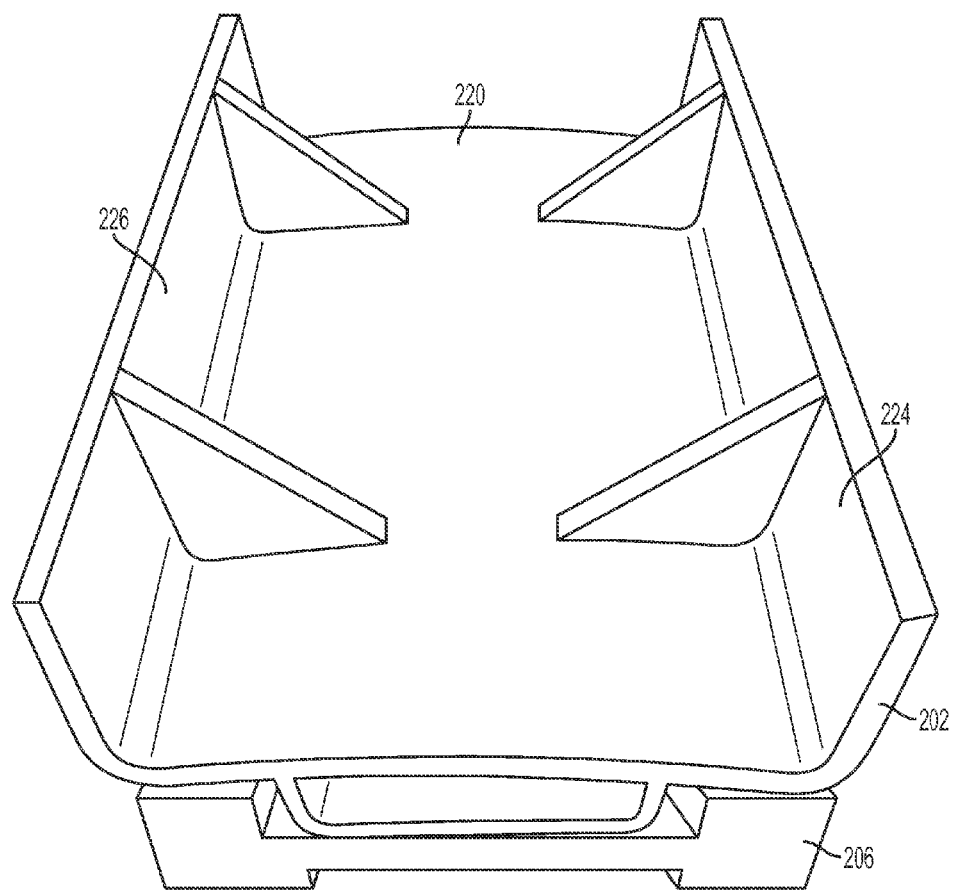
FIG. 14 is a perspective view of the base member of FIG. 13 shown along with a traction plate.

FIG. 12 depicts an embodiment of the base member 206. As shown, base member 206 can include an upper surface 232 having a recess 234 that substantially approximates the external dimensions of the channel 222 of a corresponding traction plate (not shown), however, other configurations are possible. The base member 206 can include chamfered corners 252 as shown in FIG. 12. According to embodiments, the chamfered corners can ease rolling of the base member, and can facilitate easier application of the tire traction device to a tire. Referring to FIG. 13, another embodiment of base member 206 is shown. According to this embodiment, the first, or lower surface 230 of the base member 206 can include a plurality of contact pads 260 separated by one or more reliefs 262. For example, in the embodiment shown, the base member 206 can have contact pads 260 located at its corners, and a central relief 262 can separate the contact pads 260 from one another. One of ordinary skill in the art will appreciate from this disclosure, however, that other embodiments are possible. According to embodiments, the contacts pads 260 can rest on the circumference of the tire, and provide resistance against slippage. The relief(s) 262 can help increase the grip of the contact pads 260 on the tire circumference. Additionally or alternatively, the relief(s) 262 can provide flexibility to the base member 206, which allows the base member 206 to better conform to, and grip, the tire circumference. FIG. 14 depicts the base member 206 of FIG. 13 in conjunction with the traction plate 202 of FIG. 8, however, the corners between the plate portion 220 and paddles 224, 226 of the traction plate 202 are more rounded in FIG. 14 than they are in FIG. 8.

Referring back to FIG. 8, the traction plate 202 can define a width W1, a length L, and the traction-increasing elements 224, 226 can define a height H1. The channel 222 can also define a width W2. The base member 206 can define a width and length (not labelled), that generally correspond to those of the traction plate 202. The base member 206 can also define a height H2.

According to embodiments, the length L of the traction plate 202 can depend, in part, on the tire for which the traction plate 202 is intended to be used. According to embodiments, the length L can range from about 1 inches to about 3 inches.

The width W1 of the traction plate 202 can depend on the tire with which it is used, as well as on the conditions in which the tire traction device is being used. Accordingly, embodiments of the traction plate 202 can be provided in a variety of sizes, including a small version having a width W1 of between about 1 inches and about 3 inches, a medium version having a width W1 of between about 4 inches and about 6 inches, and a large version of between about 6 inches and about 12 inches. According to embodiments, the small, medium, and large versions of the traction plate 202 can be provided in a kit along with a base member 206 and straps 204A, 204B, allowing the user the option to select the appropriate traction plate for a given application.

According to some embodiments of the small version, the width W1 of the traction plate 202 can be about the same as the width W2 of the channel 222, such that the paddles 224, 226 extend directly upward from the opposed ends of the channel 222, however, other configurations are possible.

Still referring to FIG. 8, the base member can define a height H2 that can generally range from about ½ inch to about 3 inches, more specifically, from about 1 inch to about 2 inches, however, other dimensions are possible. The traction-enhancing elements 224, 226 can have a height H1 of between about ½ inch and about 2 inches, more specifically, between about 1 inch to about 2 inches, however, other dimensions are possible. According to an embodiment, the heights H1 and H2 can add up to between about 1 inches and about 3 inches.

According to embodiments, the traction plate 202 can be formed from metal, such as steel or aluminum, and the base member 206 can be formed from rubber. Alternatively, the traction plate 202 can be formed from other rigid materials such as composites and plastics. The parts of the traction plate 202 can be monolithic, for example, when formed by extrusion or injection molding, or alternatively, can be separate parts attached together by welding, bonding, fasteners, or the like. Alternative materials for the base member 206 can include, for example, plastics, wood, Delrin, Acetal, steel, aluminum, and composites.

Figure 15:
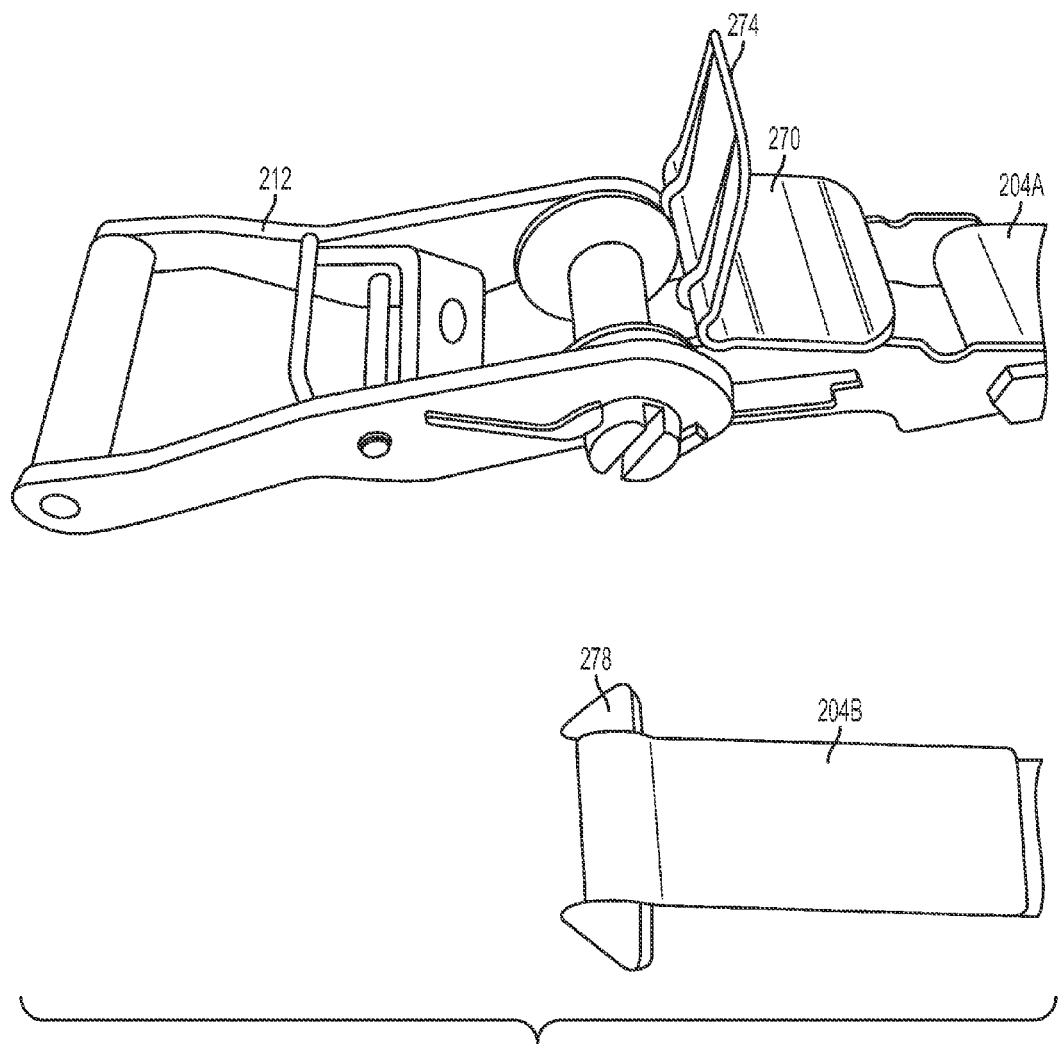
FIG. 15 is a side-perspective view of a portion of a primary strap and secondary strap of the tire traction device of FIG. 6.

FIG. 15 depicts an embodiment of a ratchet 212 that can be used with the primary strap 204A and/or secondary strap 204B according to various embodiments. The ratchet 212 can be attached to a free end of the primary strap 204A, in which case the strap 204A and ratchet 212 can comprise a "ratchet strap," such as, for example and without limitation, a Model No. MR5010EL ratchet strap from US Cargo Control (202 Blue Creek Drive, Urbana, Iowa 52345) or the like. One of ordinary skill in the art will appreciate from this disclosure that other types of ratchet straps, and straps generally, can be used instead of the foregoing. For example, according to embodiments, the primary strap 204A can include a buckle, cam lock, or other type of connector to secure the strap 204A in place. According to embodiments, the ratchet 212 or other type of connector can be attached to the strap by stitching, fasteners such as rivets, bonding, or other techniques known in the art.

Figure 16:
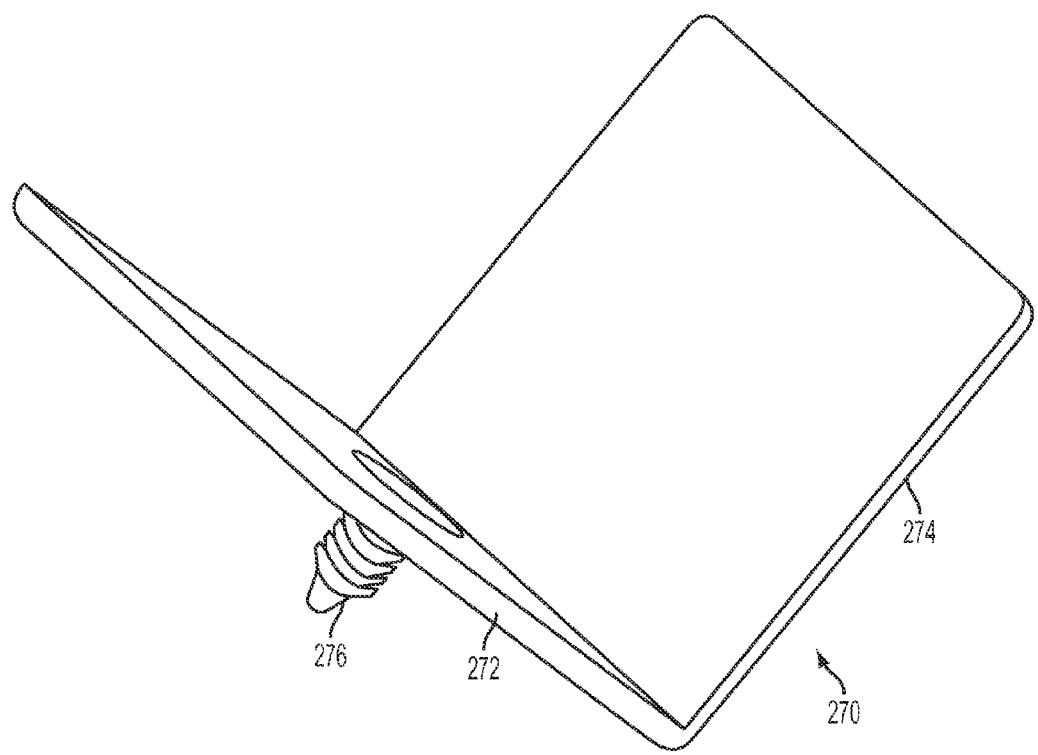
FIG. 16 is a perspective view of an embodiment of a rim protector.

Still referring to FIG. 15, the ratchet 212, if provided, can include a rim protector 270 secured to the ratchet 212. With reference to FIG. 16, the rim protector 270 can include a first portion 272 adapted to connect to the ratchet 212, for example, using a fastener 276 such as a screw or rivet. Alternatively, the rim protector 270 can be formed integrally with the ratchet 212, or can be welded or bonded thereto.

The rim protector 270 can also include a second portion 274 adapted to engage onto the rim of a vehicle wheel. As shown in FIGS. 15 and 16, the second portion 274 can comprise a flange-like member that extends from the first portion 272 at an angle, e.g., of about 90 degrees. When the primary strap 204A is secured to a vehicle wheel, for example, in the position shown in FIG. 6, the second portion 274 of the rim protector 270 can engage under the lip of the rim and hold the ratchet 212 in position on the tire sidewall. According to embodiments, the rim protector 270 can be formed from a rigid material such as metal or hard plastic. However, according to embodiments, the rim protector can also include a flexible layer or coating, such as rubber, plastic, composite, leather, etc., that can help minimize damage caused by contact between the rim protector 270 and the rim.

Referring back to FIG. 15, also shown in a portion of secondary strap 204. The secondary strap 204B can have a stop 278 located at one of its free ends. The stop 278 can have a dimension (e.g., width) that is larger than a corresponding dimension of the channel 222 in traction plate 202. Accordingly, in use, one free end (not shown) of the secondary strap 204B can be fed through the channel 222 until the stop 278 engages the end of the channel 222, thereby preventing further movement of the strap 204B in the direction of feed through the channel 222. In FIG. 15, the stop 278 is shown as a substantially flat metal plate having a width that is larger than the width of the channel 222. In FIG. 15, the stop is shown as being sewn into the strap 204B, however, other shapes, materials, and attachment methods are possible, provided the stop 278 has a shape and strength that prevents it from pulling through the channel 222.

Figure 17:
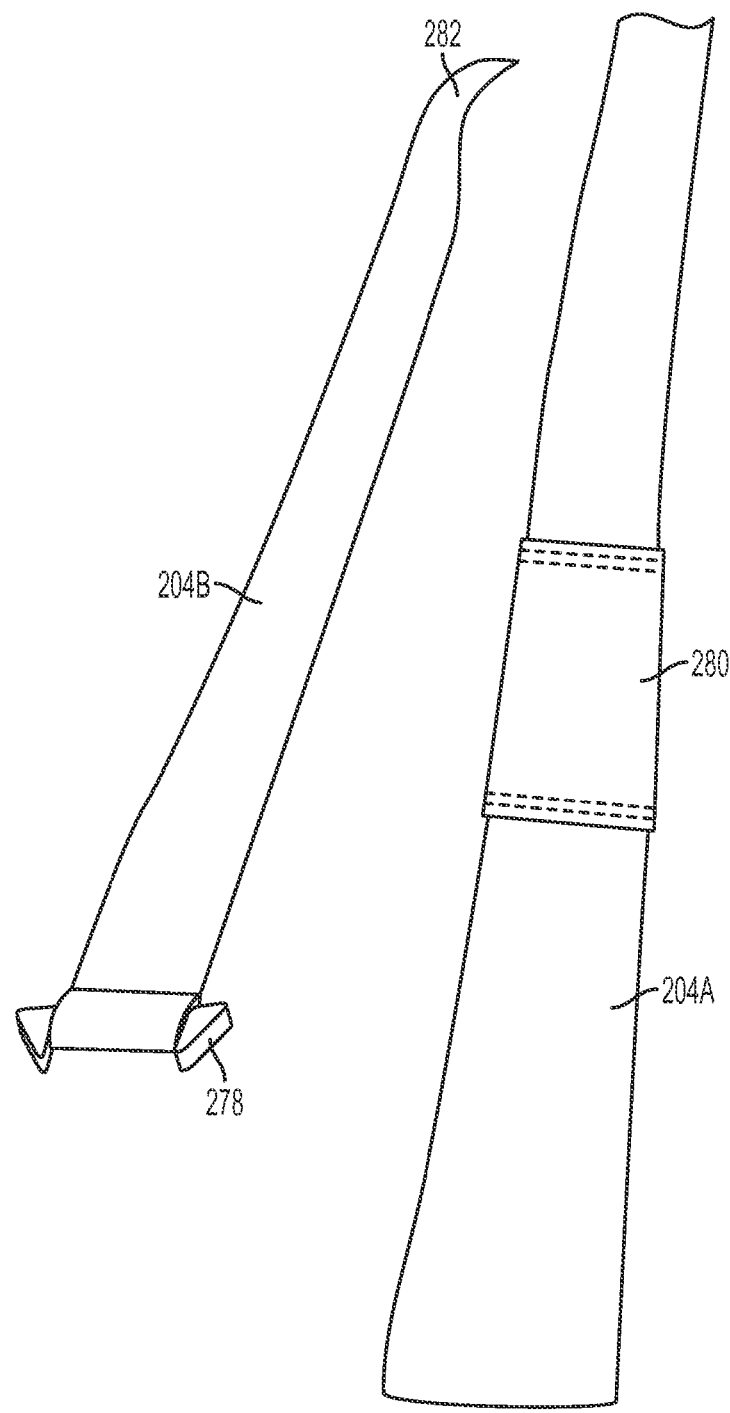
FIG. 17 is a front-perspective view of a portion of the primary strap and secondary strap of FIG. 15.

FIG. 17 shows an embodiment of the secondary strap 204B next to a portion of the primary strap 204A. According to embodiments, the secondary strap 204B can have a slightly smaller width than the primary strap 204A, and can be adapted to overlay a portion of the primary strap 204A when in use. The secondary strap 204B can include a free end 282 opposite to the stop 278 that can engage with the ratchet 212, or other fastening device, as will be discussed in more detail below. Still referring to FIG. 17, at least a portion of the primary strap 204A can include a protective cover 280, as will be described in more detail below.

According to embodiments, the primary strap 204A can comprise a heavy duty Nylon® strap material or the like. Embodiments of the strap 204A can have a width of between about 2 inches and about 4 inches, preferably about 2.5 inches to about 3 inches. Embodiments can also have a length that varies from about 24 inches from end-to-end to about 60 inches end-to-end, however, other lengths are possible.

According to an embodiment, all or a portion of the strap 204A can be multi-layered. For example, a multi-layered strap can be formed by inserting a length of Nylon® or other strap-material through a slot or other coupler in the ratchet 212, folding the material over onto itself, and joining the layers of strap material together, for example, by stitching or bonding. According to an embodiment, about half of the strap can comprise multiple layers of material, and the other half can comprise a single layer of material. For example, according to an embodiment of a 48 inch strap, the strap can comprise a double-layer of Nylon® for approximately 24 inches starting from the ratchet 212, and can comprise a single layer of Nylon® for the remaining 24 inches. Additionally or alternatively, a reinforcement layer of strong and/or abrasion-resistant material can be applied to portions of the strap 204A. For example, according to the 48 inch embodiment discussed above, a layer of Kevlar® or Cordura® can be attached to the single layer of Nylon® starting where the double layer ends, and can extend over the single layer toward the free end of the strap for a length of about 4 inches to about 12 inches. One of ordinary skill in the art will understand based on this disclosure, however, that other strap configurations, materials, and manufacturing techniques are possible. For example, alternative embodiments can use a rubber strap, steel-reinforced rubber strap, plastic strap, or other strong strap construction known in the art.

The secondary strap 204B can be formed from similar materials to the primary strap 204A. According to embodiments, the secondary strap 204B can have a width between about 0.75 inches and about two inches, and a length of between about eight and 24 inches.

Figure 18:
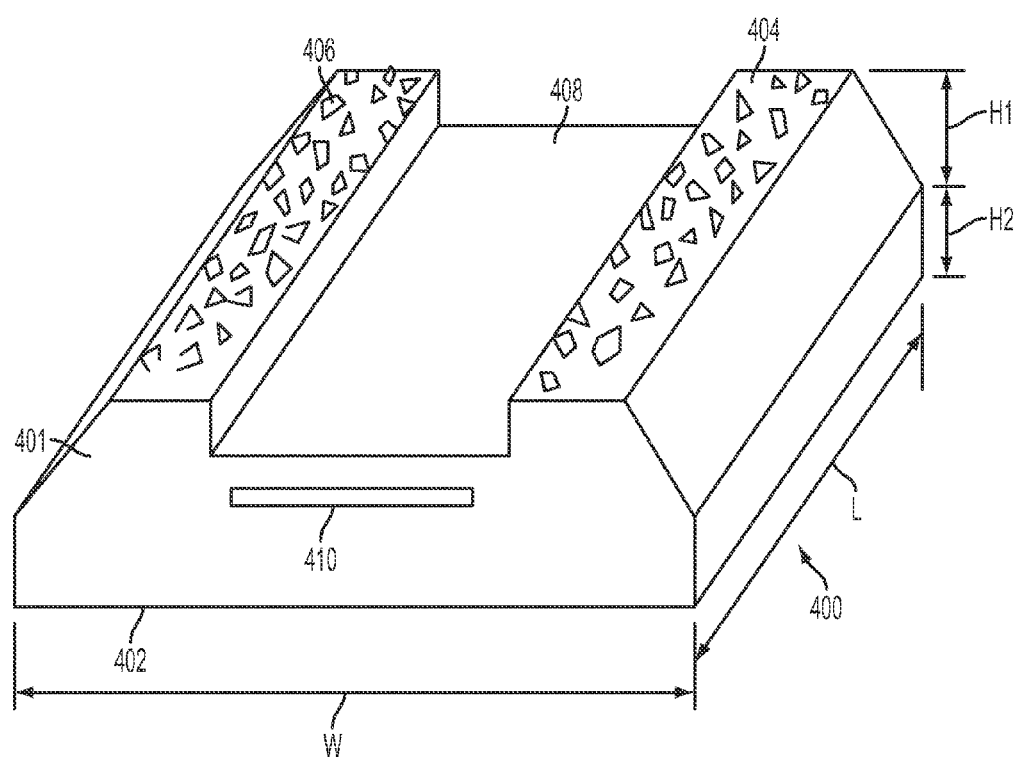
FIG. 18 is a perspective view of a third embodiment of a tire traction device.

FIG. 18 depicts another embodiment of a tire traction device 400. The embodiment of FIG. 18 may be particularly suited, without limitation, for use in urban locations, where damage to the road surface should be minimized, and/or in the oil and gas industry, where sparks should be avoided. The tire traction device 400 can include a base member 401 having a first surface 402 adapted to sit on a circumferential surface (not shown) of a vehicle tire (not shown). The first surface 402 can have one or more of the features described above in connection with previous embodiments (e.g., curved surface, friction-enhancing texture, contact pads, reliefs) to facilitate retention of the base member 401 on the tire circumference. The base member 401 can also include a second surface 404 opposite to the first surface 402. The second surface 404 can include surface roughening features 406, such as chips, spikes, texture, or other features embedded into, molded into, or otherwise attached to the base member 401. For example, according to an embodiment, the base member 401 can comprise a rubber material, such as recycled tire rubber, and the surface roughening features 406 can comprise coarse chips, such as Delrin® chips located on the second surface 404, however, other embodiments are possible.

Still referring to FIG. 18, the base member 401 can also include a transverse channel 408 extending through the second surface 404. In use, the transverse channel 408 can be aligned substantially parallel with the axis of the vehicle wheel, in which case, the transverse channel 408 can help increase traction provided by the traction device 400. Additionally or alternatively, the transverse channel 408 can be used to receive a primary strap (see description of primary strap 204A provided herein above) and/or a secondary strap (see description of secondary strap 204B provided herein above) to secure the traction device 400 on the vehicle tire. The base member 402 can also include a channel 410 that extends through the base member 402 from one end to another. According to an embodiment, the channel 410 can be configured to receive and engage the primary strap and/or the secondary strap (see description of primary strap 204A and secondary strap 204B provided herein above) to help secure the traction device on the vehicle tire. Alternatively, the transverse channel 408 can be configured to receive one of the primary or secondary straps, and the channel 410 can be configured to receive the other of the primary and secondary straps. The transverse channel 408 and channel 410 can thus provide the user with multiple options for attaching the traction device to the vehicle tire.

The base member 401 can be manufactured from a variety of materials and using a variety of techniques. For example, as discussed above, the base member 401 can be formed from rubber, such as recycled tire rubber, however, other materials are possible. For example, the base member 401 can alternatively be made from plastic, composite, wood, or other durable materials. The surface roughening features can be made from a variety of materials, such as, plastic, metal, natural materials such as stone, and the like. The surface roughening features can comprise regular-shaped objects such as lugs, spikes, or treads, or can comprise irregular shaped objects such as coarse chips. Further, the surface roughening features 406 can be formed integrally with the base member 401, or else, can comprise separate elements molded into or attached to the base member 401. According to an embodiment, the surface roughening features 406 can be co-molded into the base member 401, however, other embodiments are possible as will be apparent to one of ordinary skill in the art based on this disclosure.

Still referring to FIG. 18, the base member 401 can define a width W, a length L, and first and second heights H1, H2. According to embodiments, the length L of the traction plate 202 can depend, in part, on the tire for which the traction plate 202 is intended to be used. According to embodiments, the length L can range from about six inches to about twenty inches.

The width W of the base member 401 can depend on the tire with which it is used, as well as on the conditions in which the tire traction device 400 is being used. Accordingly, embodiments of the base member 401 can be provided in a variety of sizes having dimensions that range from about four inches to about twelve inches, for example, from about seven inches to about ten inches, more specifically, from about five inches to about six inches. Still referring to FIG. 18, the base member 401 can define an overall height (H1 plus H2) that can generally range from about 1 inch to about 3 inches, more specifically, from about 1.5 inches to about 2.5 inches, however, other dimensions are possible. The overall height of the base member 401 can be split approximately evenly between H1 and H2, however, other dimensions are possible.

Figure 19:
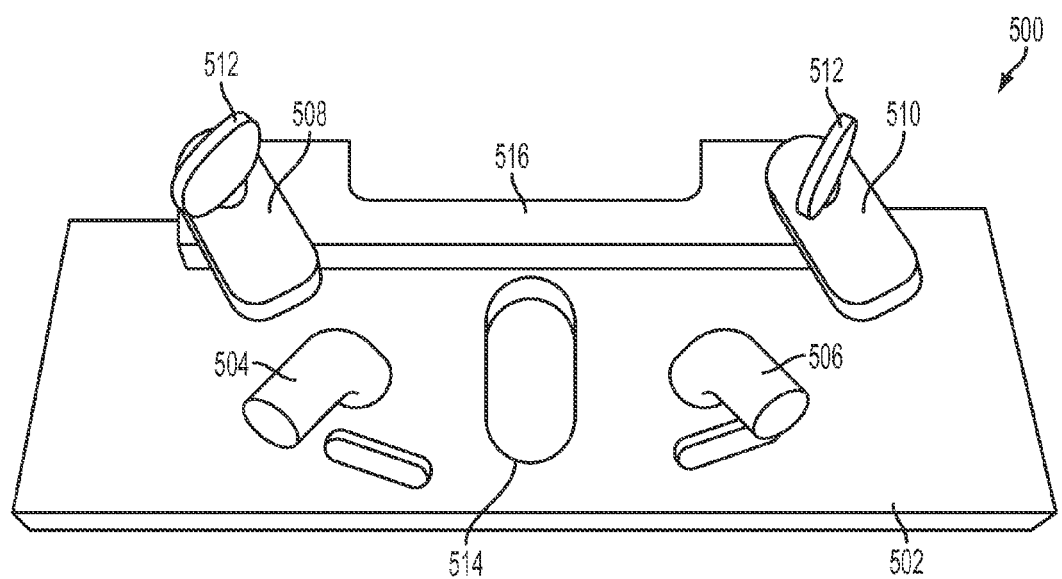
FIG. 19 is a perspective view of an embodiment of a valve protector.
Figure 20:
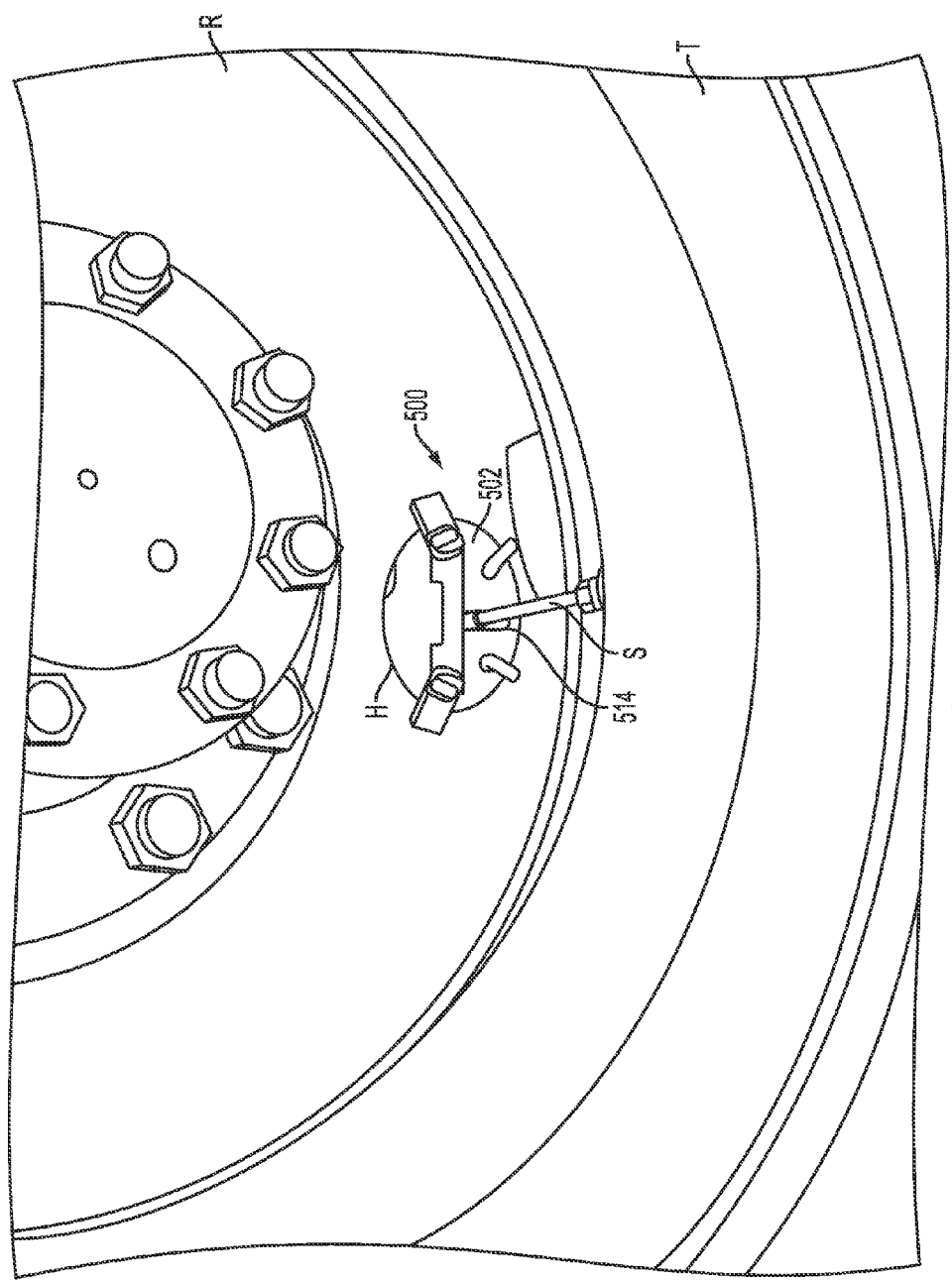
FIG. 20 is a perspective view of the valve protector of FIG. 19, show attached to a tractor trailer rim.

FIGS. 19 and 20 depict an embodiment of a valve stem protector 500 according to the present invention. The valve stem protector 500 can be used to protect a tire's valve stem S from becoming damaged by contact with the primary strap. For example, the valve stem protector 500 can provide a surface that engages straps and holds them away from the valve stem S, when tension is applied, therefore avoiding deformation and/or damage to the valve stem S.

Referring to FIGS. 19 and 20 together, the valve stem protector 500 can include a plate 502, such as a metal plate, that can rest against a surface of the rim R. For example, the plate 502 can rest against a hole H in the rim R through which the valve stem S protrudes. The protector 500 can include fixed brackets 504, 506 that extend through the hole H and engage on the rim R. The protector can further include adjustable brackets 508, 510 that can be inserted through the hole H and locked into place on the rim, e.g., using thumb screws 512 or other fasteners. For example, after insertion through the hole, the adjustable brackets 508, 510 can be pivoted into engagement with the rim R and locked in place with the thumb screws 512, as shown in FIG. 20. One of ordinary skill in the art will appreciate based on this disclosure that other configurations are possible to removably secure the plate 502 to the rim R behind hole H.

Referring to FIG. 19, the plate 502 can include an aperture 514, such as an elongated slot, through which the valve stem S can pass. The plate 502 can further include a seat 516 (e.g., a u-shaped recess or other substantially flat surface) upon which the primary strap can rest. When the plate 502 is securely fastened to the rim R as described above, the seat 516 can provide a surface upon which the strap sits, and which maintains the strap at a distance from the valve stem S, even when tension is applied to the strap. Accordingly, when tire traction devices according to the present invention are applied to the tire, the valve stem protector 500 inhibits the strap(s) from contacting and damaging the valve stem S.

Figure 21A:
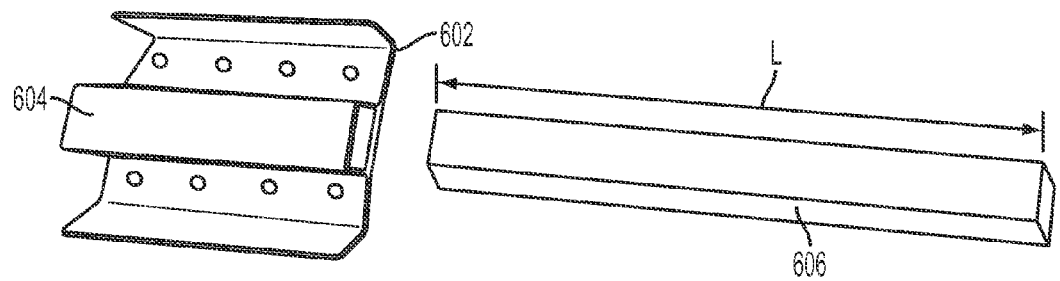
FIG. 21A is a top view of an embodiment of a tire traction device with extension member.
Figure 21B:
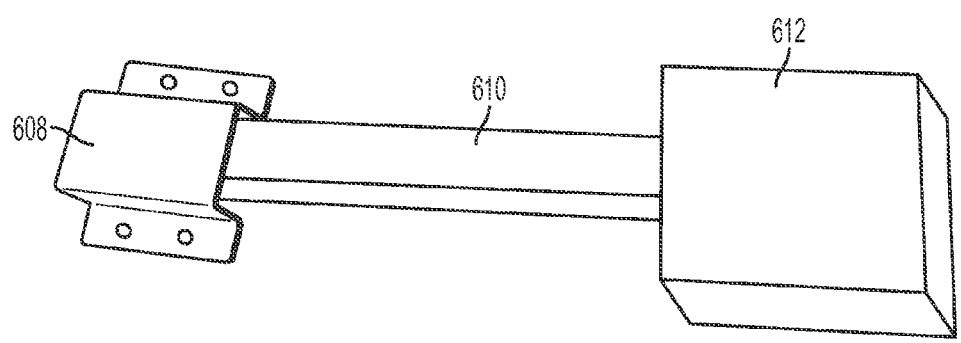
FIG. 21B is a top view of another embodiment of a tire traction device with extension member.

FIGS. 21A and 21B depict embodiments of a tire traction device including an extension member that can be used, for example, to help eject the tire out of mud, sand, or other hazards. The extension member can comprise an optional member that can be attached to the tire traction devices described hereon on an "as needed" basis. Accordingly, as will be described in more detail below, according to embodiments, the extension member can be attached and detached from the tire traction devices.

FIG. 21A depicts an embodiment of a traction plate 602 that is similar in function and use to the traction plates described previously herein, with the exception that the traction plate 602 includes an adapter 604 for coupling an extension member 606 to the traction plate 602. When the traction plate 602 is secured in place on the tire T, the extension member 606 can extend beyond the tire sidewall in the radial direction (e.g., between about 1 feet and about 3 feet), thereby increasing the amount of ground surface that the traction device can engage. According to the embodiment shown in FIG. 21A, the adapter 604 can comprise a channel-like receptacle located on the traction plate 602. The extension member 606 can comprise an extension bar (e.g., a hollow steel beam) with one end that engages within the receptacle. Fasteners, such as a snap pin, through bolt, collet, or other device can be used to further secure the extension member 606 to the adapter 604. According to embodiments, the extension member 606 can define an overall length L of between about 18 inches and about 4 feet, more specifically, between about 2 feet and about 3 feet, however, other dimensions are possible. The extension member can be formed from metal, such as steel or aluminum, strong plastic, composite, or other strong materials known in the art.

FIG. 21B depicts another embodiment of an adapter 608 shown separated from the traction plate 602. As shown here, the adapter 608 can comprise a piece of steel sheet or other material that is attached to the traction plate 602, for example, by welding, bonding, or mechanical fasteners. FIG. 21B also depicts another embodiment of the extension member 610, which includes an enlarged block 612 at the end opposite to the adapter 608. The block 612 can have a shape that provides additional traction. While the block 612 is shown as a cube in FIG. 21B, other embodiments are possible, such as a star-shape, a paddle wheel, or other shapes with traction-enhancing features.

The extension members 606, 610 can have other cross-sectional shapes than shown in FIGS. 21A and 21B. For example, according to alternative embodiments, the extension members 606, 610 can have traction-enhancing features such as lugs, spikes, paddles, or other features distributed around their surface. Also, the extension members 606, 610 are not limited to being straight as shown, but can alternatively have angled or contoured shapes. Further, one of ordinary skill in the art will understand based on this disclosure that other attachment mechanisms than those shown can be used to couple the extension members to the traction plate 602.

Figure 22A:
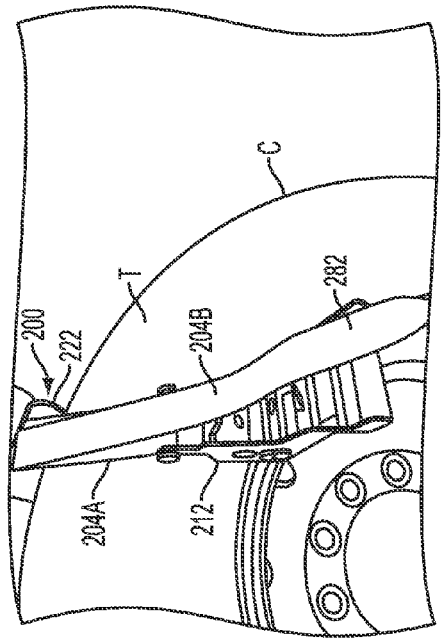
FIGS. 22A-22D depict an embodiment of a method of attaching a tire traction device to a tractor trailer tire.
Figure 22B:
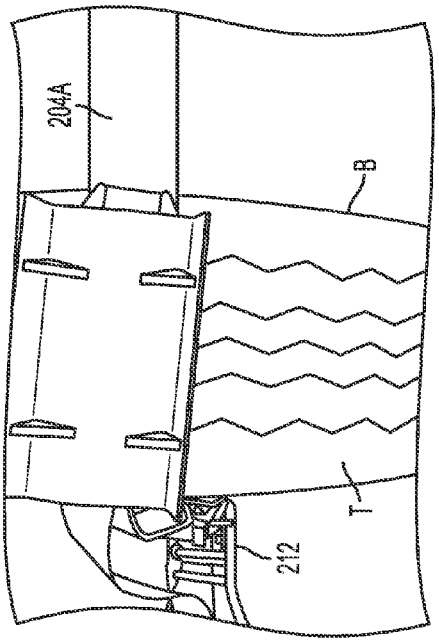
Figure 22C:
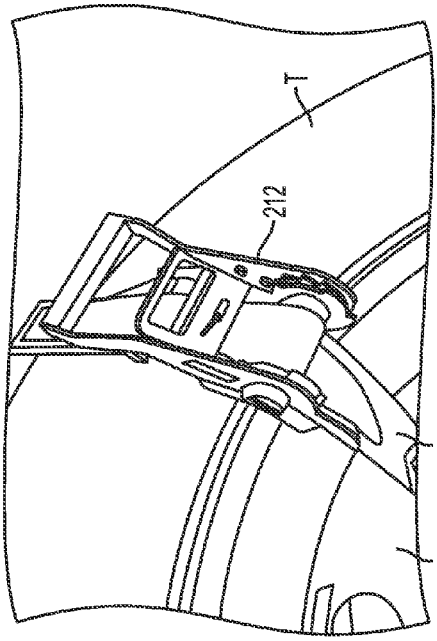
Figure 22D:
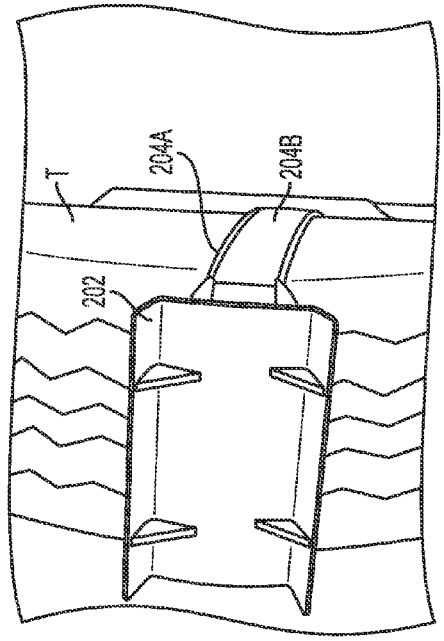

FIGS. 22A to 22CD depict an example of a method of attaching a tire traction device to a tire T. The method is depicted in connection with the tire traction device 200 of FIGS. 6 to 8, however, the same or similar steps can be performed with other embodiments described herein. FIG. 22A depicts the tire T after the tire traction device 200 has been placed on its circumference C. At this point, the traction sheet 202 is resting on top of the base member 206, which is in turn resting on the tire circumference C. Prior to or after placing the traction plate 202 and base member 206 on the tire, the primary strap 204A can be inserted through the channel 222. The ratchet 212 can rest on the front sidewall of the tire T. The secondary strap 204B can also be inserted through the channel 222, e.g., on top of the primary strap 204A. One end of the secondary strap 204B can engage with the channel 222, and the opposite free end 282 can extend down and over the ratchet 212.

Referring to FIG. 22B, the user can wrap the primary strap 204A around the back of the wheel, through rim R (e.g., through a hole H in the rim) and bring the free end of the primary strap 204A near the ratchet 212. Then, as shown in FIG. 22C, the user can feed the free end of the primary strap 204A into the ratchet 212, such that the strap 204A forms a closed loop around the tire T and traction device 200 and through the rim R (e.g., in the poloidal direction). The user can then use the ratchet 212 to tighten the primary strap 204A, and securely fasten the tire traction device 200 to the tire T. The user can additionally feed the free end 282 of the secondary strap 204B through the ratchet 212 and tighten the secondary strap 204. This, in turn, can pull the secondary strap against the lateral end of the channel 222 (e.g., through the stop), to further secure the portion of the traction device 200. The primary strap 204A and secondary strap 204B can be tightened sequentially with ratchet 212, or alternatively, can be tightened simultaneously with ratchet 212. The user can repeat the process above to apply multiple traction devices 200 to the tire T. The user can also reverse the process described above to remove the tire traction device(s) 200 from the tire T. Additionally, according to another embodiment, two traction devices 200 can be attached to a tire T using a single primary strap 204A, for example, by locating the traction devices at substantially diametrically-opposed positions on the tire, and looping the strap 204A around the tire from front to back, through both traction devices 200, however, other embodiments are possible.

One of ordinary skill in the art will understand from this disclosure, that the above-described processes do not have to be performed in the exact order described. Rather, the various steps of applying the traction device(s) 200 to the tire T, and removing the traction device(s) 200 from the tire T, can be performed in any number of different sequences. Although not specifically depicted, the tire traction devices according to the present invention can be used on tires that already have conventional snow chains in place. For example, if a vehicle is travelling with snow chains in place, and becomes stuck off road, the tire traction devices according to the present invention can be applied to the tires over the snow chains, in order to help rescue the stuck vehicle.

Figure 23:
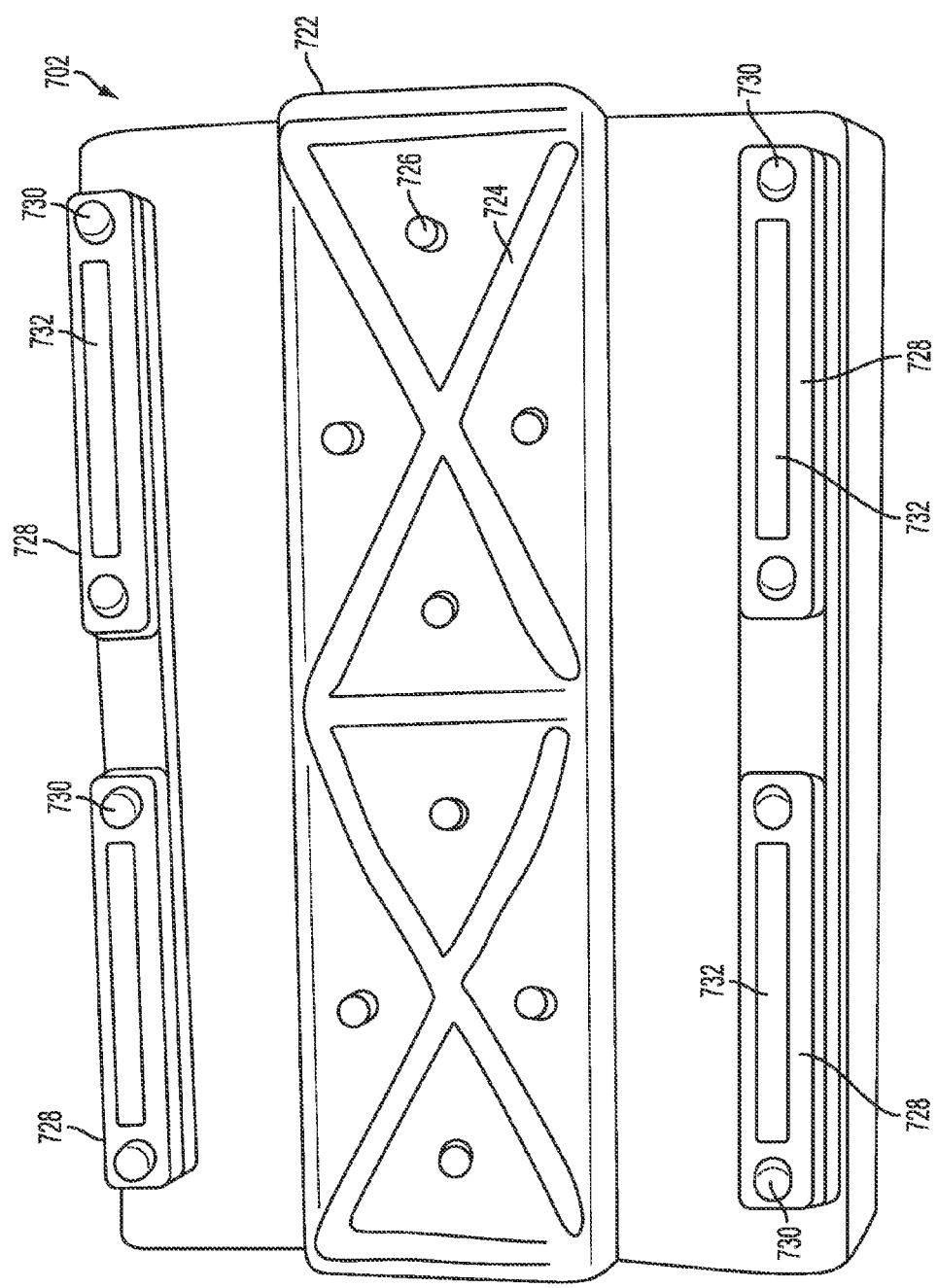
FIG. 23 depicts the lower surface of another embodiment of a traction plate that is adapted for use without a base member.

Referring to FIG. 23, embodiments of the tire traction devices described herein can be used without the base member. This can be done, for example, by resting the traction plate directly on the circumference of the tire. Additionally or alternatively, the underside of the traction plate can be configured to grip the circumference of the tire. FIG. 23 shows the underside of an embodiment of a traction plate 702 having surface features configured to provide grip on the tire circumference. For example, the traction plate 702 can include raised protrusions 724, 726 on the underside of channel 722 that grip on the tire surface. Additionally or alternatively, raised lugs 728 can be located on one or both sides of the channel 722, and can provide additional purchase on the tire circumference. According to alternative embodiments, the channel 722 can extend upward from the plate 702 instead of from below it. As shown, protrusions 730, 732 can be provided on the lugs 728 to further increase grip. The aforementioned lugs and protrusions can be formed integrally with the traction plate 702, or alternatively, can be added structures joined to the traction plate 702, for example, by mechanical fasteners, bonding, or welding. One of ordinary skill in the art will appreciate from this disclosure that other structures besides the protrusions and raised lugs can be used to provide grip between the underside of the traction plate 702 and the tire circumference, such as grip-tape and other surface textures, various surface coatings such as rubber, and various shaped protrusions such as studs, ribs, and spikes.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A tire traction device, comprising:
 a primary strap configured to extend around a portion of a vehicle tire and through an opening in a vehicle rim;
 a traction plate having a tire-interfacing surface and an exterior-facing surface, the traction plate having a width, the traction plate having a channel that extends along the width of the traction plate, the channel being configured to receive the primary strap,
 wherein the exterior-facing surface comprises a floor, a first paddle that extends substantially transversely from the floor along the width of the traction plate, and a second paddle that extends substantially transversely from the floor along the width of the traction plate, the first paddle bordering a first side of the traction plate and the second paddle bordering a second side of the traction plate opposite the first side, the first and second paddles having a height above the floor that is greater than the remaining exterior-facing surface; and
 wherein the tire-interfacing surface is adapted to sit on a circumferential portion of the vehicle tire.

2. The tire traction device of claim 1, wherein the first and second paddles define outer circumferential surfaces adapted to engage the ground, the first and second paddles further comprising studs extending from the outer circumferential surfaces.

3. The tire traction device of claim 2, wherein the studs are removably and replaceably coupled to the first and second paddles.

4. A tire traction device, comprising:
 a primary strap configured to extend around at least a portion of a vehicle tire;
 a traction plate having a channel configured to receive the primary strap, and one or more traction-enhancing surfaces extending from the channel; and
 a base member having a first surface adapted to sit on a circumferential portion of the vehicle tire, and a second surface opposite to the first surface, wherein the second surface defines a recess adapted to receive the channel of the traction plate,
 wherein the traction plate includes a plate portion extending substantially parallel to the channel, and the one or more traction-enhancing surfaces extend transversely from the plate portion.

5. The tire traction device of claim 4, wherein the one or more traction-enhancing surfaces comprise first and second paddles extending substantially perpendicular to the plate portion.

6. The tire traction device of claim 5, further comprising reinforcement gussets extending between the plate portion and the first and second paddles.

7. The tire traction device of claim 1, wherein the tire-interfacing surface includes a plurality of lugs and/or protrusions adapted to contact the circumferential portion of the vehicle tire.

8. The tire traction device of claim 1, wherein the primary strap includes a ratchet adapted to tighten the primary strap around the vehicle tire.

9. The tire traction device of claim 8, further comprising a rim protector coupled to the ratchet, the rim protector adapted to engage a rim of the vehicle tire.

10. The tire traction device of claim 8, further comprising a secondary strap adapted to extend through the channel of the traction plate and overlay the primary strap, the secondary strap having a first free end with an enlarged member adapted to engage with a lateral end of the channel.

11. The tire traction device of claim 10, wherein the secondary strap further has a second free end including a stop adapted to engage within the ratchet of the primary strap.

12. A tire traction device, comprising:
 a primary strap configured to extend around at least a portion of a vehicle tire;
 a traction plate having a channel configured to receive the primary strap, and one or more traction-enhancing surfaces extending from the channel; and
 a valve stem protector adapted to engage a rim of the vehicle tire proximate a valve stem, and hold the primary strap out of contact with the valve stem.

13. A tire traction device, comprising:
 a primary strap configured to extend around at least a portion of a vehicle tire;
 a traction plate having a channel configured to receive the primary strap, and one or more traction-enhancing surfaces extending from the channel;
 a receptacle located on the traction plate; and
 an extension bar adapted to engage within the receptacle and extend axially away from the vehicle tire.

14. A tire traction device, comprising:
 a primary strap configured to extend around at least a portion of a vehicle tire;
 a rubber base member having a first surface adapted to sit on a circumferential portion of the vehicle tire, and a second surface opposite to the first surface, the second surface defining a transverse channel and surface-roughening features on opposite sides of the transverse channel, the rubber base member further including a channel extending through the base member and adapted to receive the primary strap.

15. The tire traction device of claim 14, wherein the surface-roughening features comprise chips embedded in the second surface.

16. The traction device of claim 14, wherein the surface-roughening features comprise treads molded on the second surface.

17. A method of attaching a tire traction device to a vehicle tire, comprising:

(a) placing a primary strap through a channel in a traction plate;
(b) placing the traction plate on a circumferential portion of the vehicle tire;
(c) wrapping the primary strap around a portion of the vehicle tire and through a rim of the vehicle tire; and
(d) tightening the primary strap using a ratchet coupled to the primary strap;
wherein the traction plate includes an exterior-facing surface comprising a floor and first and second paddles that extend substantially transversely from the floor, the first and second paddles having a height above the floor that is greater than the remaining exterior-facing surface.

18. The method of claim 17, wherein step (b) occurs before step (a).

19. The method of claim 17, further comprising:
(e) placing a secondary strap through the channel in the traction plate;
(f) tightening a first free end of the secondary strap with the ratchet; and
(g) engaging a second free end of the secondary strap with a lateral end of the channel.

20. The method of claim 19, wherein steps (d) and (f) occur substantially simultaneously.

21. The method of claim 17, wherein step (c) comprises wrapping the primary strap around the vehicle tire in a substantially poloidal direction.

22. A tire traction device, comprising:
a primary strap configured to extend around at least a portion of a vehicle tire; and
a traction plate having a floor, a channel configured to receive the primary strap, and first and second traction-enhancing surfaces extending from the floor, wherein the channel shares a wall with the floor,
wherein the first traction-enhancing surface borders a first side of the traction plate and the second traction-enhancing surface borders a second side of the traction plate opposite the first side, the first and second traction-enhancing surfaces having a height above the floor that is greater than the remaining exterior-facing surface.

* * * * *